US010460581B1

(12) United States Patent
Devison et al.

(10) Patent No.: US 10,460,581 B1
(45) Date of Patent: Oct. 29, 2019

(54) DETERMINING A CONFIDENCE FOR A MOTION ZONE IDENTIFIED AS A LOCATION OF MOTION FOR MOTION DETECTED BY WIRELESS SIGNALS

(71) Applicant: Cognitive Systems Corp., Waterloo (CA)

(72) Inventors: Stephen Arnold Devison, Kitchener (CA); Mohammad Omer, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 16/413,165

(22) Filed: May 15, 2019

(51) Int. Cl.
*G08B 13/19* (2006.01)
*G06N 20/10* (2019.01)
(Continued)

(52) U.S. Cl.
CPC ............ *G08B 13/19* (2013.01); *G06F 17/18* (2013.01); *G06N 20/10* (2019.01); *G08B 13/19606* (2013.01); *G08B 29/185* (2013.01)

(58) Field of Classification Search
CPC ............ G08B 13/19; G08B 13/19606; G08B 29/185; G06N 20/10; G06F 17/18
(Continued)

(56) References Cited

U.S. PATENT DOCUMENTS 4,054,879 A 10/1977 Wright et al.
4,649,388 A 3/1987 Atlas
(Continued)

FOREIGN PATENT DOCUMENTS

CA 2834522 5/2014
CA 2945702 8/2015
(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
(Continued)

*Primary Examiner* — Kerri L McNally
(74) *Attorney, Agent, or Firm* — Henry Patent Law Firm PLLC

(57) ABSTRACT

In a general aspect, a method is presented for determining a motion-zone confidence. In some aspects, the method includes obtaining, from a database of a motion detection system, ranges of motion-zone parameters associated with respective motion zones in a space between wireless communication devices. The method also includes analyzing the ranges of motion-zone parameters to identify, for one or more of the motion zones, overlapping ranges of motion-zone parameters and non-overlapping parameter ranges of motion-zone parameters. The method additionally includes storing, in the database of the motion detection system, the overlapping and non-overlapping ranges of motion-zone parameters. The overlapping and non-overlapping ranges of motion-zone parameters are used to identify one of the motion zones based on a motion event detected by the motion detection system.

21 Claims, 13 Drawing Sheets

(51) Int. Cl.
*G06F 17/18* (2006.01)
*G08B 29/18* (2006.01)
*G08B 13/196* (2006.01)

(58) Field of Classification Search
USPC ........................................................ 340/545.3
See application file for complete search history.

(56) References Cited

U.S. PATENT DOCUMENTS

| | | |
|---|---|---|
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,914,854 B1 | 7/2005 | Heberley et al. |
| 7,652,617 B2 | 1/2010 | Kurtz et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,030,321 B2 | 5/2015 | Breed |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 * | 2/2017 | Omer ..................... H04W 4/023 |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,127,434 B2 * | 11/2018 | Rao .................... G06K 9/00201 |
| 10,129,853 B2 | 11/2018 | Manku et al. |
| 2003/0108119 A1 | 6/2003 | Mohebbi et al. |
| 2006/0152404 A1 | 7/2006 | Fullerton et al. |
| 2006/0284757 A1 | 12/2006 | Zemany |
| 2007/0296571 A1 | 12/2007 | Kolen |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2012/0115512 A1 | 5/2012 | Grainger et al. |
| 2012/0146788 A1 | 6/2012 | Wilson et al. |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 * | 12/2015 | Huang .................... H04W 4/04 455/456.1 |
| 2016/0018508 A1 * | 1/2016 | Chen .................... G01S 5/0252 455/456.1 |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2016/0262355 A1 | 9/2016 | Swan |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 * | 3/2017 | Joshi ..................... G01S 13/538 |
| 2017/0111852 A1 | 4/2017 | Selen et al. |
| 2017/0126488 A1 | 5/2017 | Cordeiro et al. |
| 2017/0134560 A1 | 5/2017 | Barnes et al. |
| 2017/0146656 A1 | 5/2017 | Belsley et al. |
| 2017/0155439 A1 | 6/2017 | Chang et al. |
| 2017/0195893 A1 | 7/2017 | Lee et al. |
| 2017/0223628 A1 | 8/2017 | Snyder et al. |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2018/0018502 A1 | 1/2018 | Rao et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0180706 A1 | 6/2018 | Li et al. |
| 2018/0183650 A1 | 6/2018 | Zhang et al. |
| 2018/0288587 A1 | 10/2018 | Allegue Martinez et al. |
| 2018/0330293 A1 | 11/2018 | Kulkarni et al. |
| 2019/0097865 A1 | 3/2019 | Xu et al. |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014/021574 | 2/2014 |
| WO | 2014/201574 | 12/2014 |
| WO | 2015/168700 | 11/2015 |
| WO | 2016005977 | 1/2016 |
| WO | 2016/066822 | 5/2016 |
| WO | 2016/110844 | 7/2016 |
| WO | 2017/106976 | 6/2017 |
| WO | 2017/132765 | 8/2017 |

(56) References Cited

FOREIGN PATENT DOCUMENTS

| WO | 2017177303 | 10/2017 |
|----|------------|---------|
| WO | 2017/210770 | 12/2017 |
| WO | 2018/094502 | 5/2018 |
| WO | 2019041019 | 3/2019 |

OTHER PUBLICATIONS

Domenico, et al., "Exploring Training Options for RF Sensing Using CSI", IEEE Communications Magazine, 2018, vol. 56, Issue 5, pp. 116-123, 8 pgs.
Iqbal, et al., "Indoor Motion Classification Using Passive RF Sensing Incorporating Deep Learning", ISSN: 2577-2465, Electronic IEEE, Jun. 3, 2018, 5 pgs.
Kosba, et al., "Robust WLAN Device-free Passive Motion Detection", IEEE Wireless Communications and Networking Conference, Apr. 2012, 6 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.
USPTO, Notice of Allowance dated Jul. 17, 2019, in U.S. Appl. No. 16/413,109, 25 pgs.
USPTO, Restriction Requirement dated Jul. 10, 2019, in U.S. Appl. No. 16/413,114, 7 pgs.
"Support-vector machine", Wikipedia, https://en.wikipedia.org/wiki/Support-vector_machine, Mar. 14, 2019, 15 pgs.

\* cited by examiner

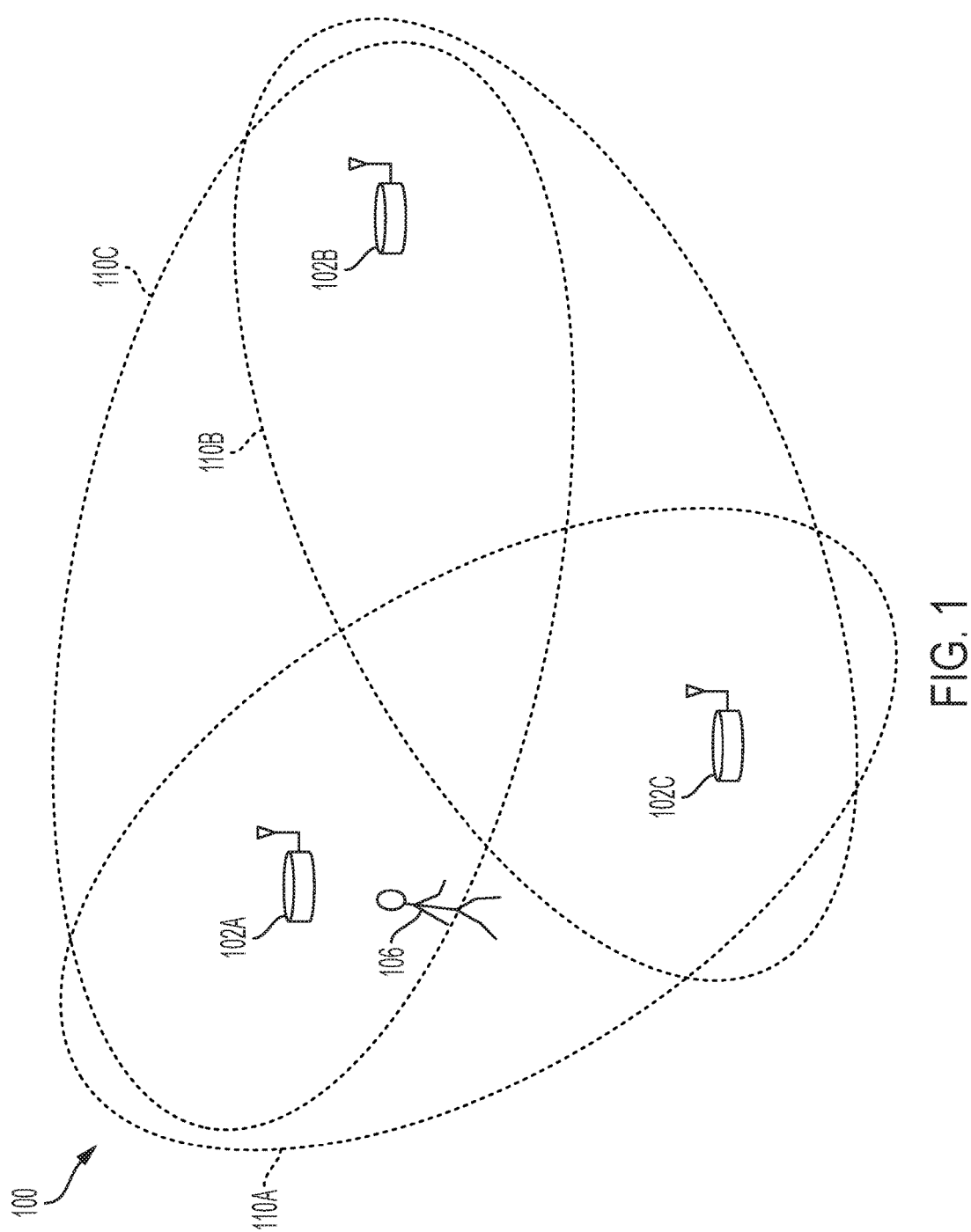

DETERMINING A CONFIDENCE FOR A MOTION ZONE IDENTIFIED AS A LOCATION OF MOTION FOR MOTION DETECTED BY WIRELESS SIGNALS

BACKGROUND

The following description relates to determining a confidence for a motion zone identified as a location of motion for motion detected by wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1 is a diagram showing an example wireless communication system.

DETAILED DESCRIPTION

Figure 2B:
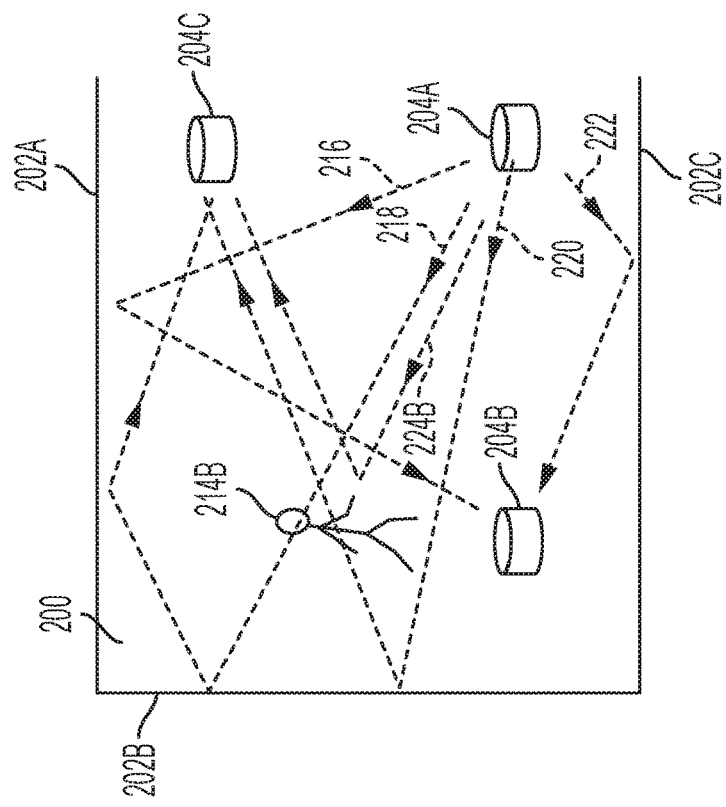
FIGS. 2A-2B are diagrams showing example wireless signals communicated between wireless communication devices.

In some aspects of what is described here the location of motion in a space (e.g., the particular room in a house where a person is moving, a particular floor or quadrant of a building where a person is moving, etc.) may be detected using information from multiple wireless communication devices communicating with each other wirelessly (e.g., through wireless signals). Such detection may be aided by partitioning the space into a plurality of motion zones and then identifying one or more of the motion zones as the location of motion. A statistical metric, such as a confidence level, may be calculated for the one or more identified motion zones. The plurality of motion zones may be determined by monitoring disturbances or excitations of wireless signals traversing the space. Once determined, the plurality of motion zones may be associated motion-zone statistical information and the collective information stored within a database. The location of future motion events may be determined by referencing the database.

In some instances, aspects of the systems and techniques described here provide technical improvements and advantages over existing approaches. For example, the systems and techniques allow for determining unique and separable motion zones with fewer wireless communication devices than traditional approaches. Traditional approached often utilize as least one wireless communication device (and possibly more) per motion zone. In contrast, the systems and techniques disclosed here allow for a lower number of devices per motion zone, which may be a small fraction of traditional approaches. Such an advantage may reduce a system's device footprint any may also increase a motion-zone coverage footprint. Moreover, the systems and techniques described here rely on the processing of statistical information, which can be accomplished through relatively light computational loads. As such, the systems and techniques are suitable for running on data processing devices without high processing power. Other improvements and advantages are possible, as will be presented below.

In some instances, wireless signals received at each of the wireless communication devices in a wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to detect whether motion has occurred in the space, to determine a relative location of the detected motion, or both. In some aspects, the channel information for each of the communication links may be analyzed to detect whether an object is present or absent, e.g., when no motion is detected in the space.

Example motion detection and localization algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," and other techniques.

FIG. 1 illustrates an example wireless communication system 100. The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the moving object's movement to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes detected in the communication channel. In some cases, another device (e.g., a remote server, a network-attached device, etc.) is configured to perform one or more operations of the motion detection system. For example, each wireless communication device 102 may send channel information to central device or system that performs operations of the motion detection system.

In an example aspect of operation, wireless communication devices 102A, 102B may broadcast wireless signals or address wireless signals to other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of the example process 600 described with respect to FIG. 6, or another type of process for detecting motion.

Figure 2A:
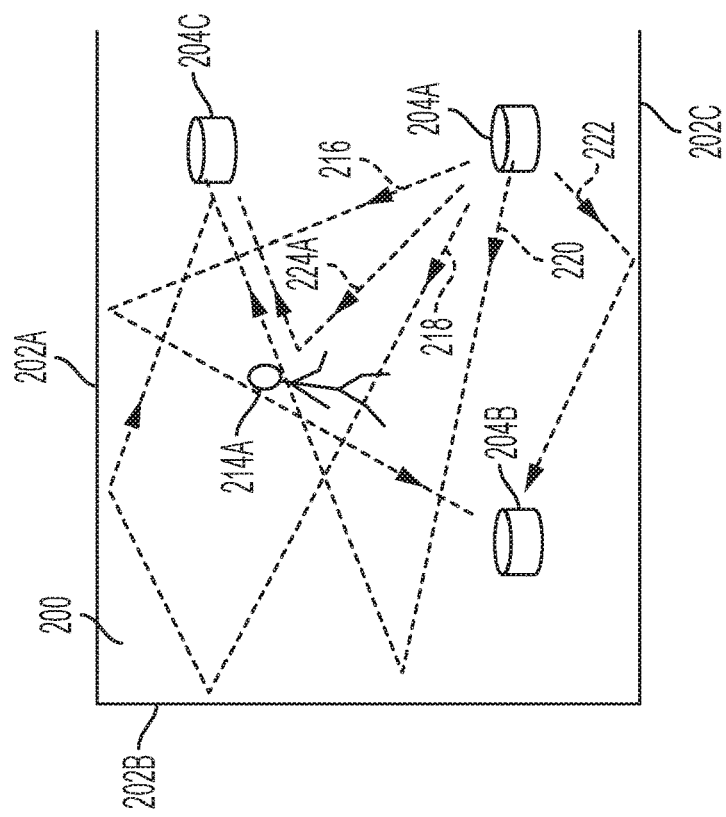

FIGS. 2A and 2B are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. When the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—will not change.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \qquad (4)$$

The received signal R at a wireless communication device can then be analyzed, for example, to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \qquad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response may indicate lack of movement. Thus, in some implementations, the complex values $Y_n$ for each of multiple devices in a wireless network can be processed to detect whether motion has occurred in a space traversed by the transmitted signals f(t).

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 3A:
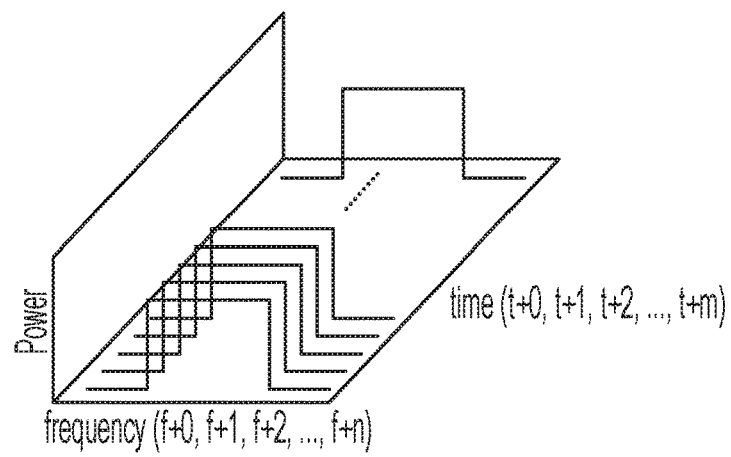
FIG. 3A is a graph, in perspective view, of an example wireless signal communicated over a wireless link through a space between two wireless communication devices.
Figure 3B:
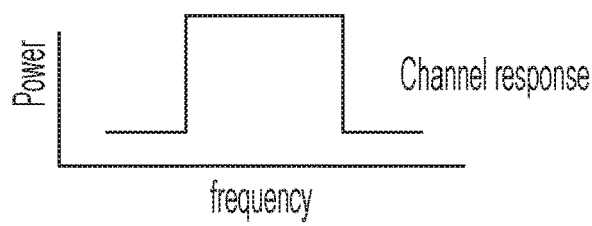
FIG. 3B is a graph, in a frequency domain, of an example individual channel response of the example wireless signal of FIG. 3A.

Now referring to FIG. 3A, a graph is presented, in perspective view, of an example wireless signal communicated over a wireless link through a space between two wireless communication devices. The graph depicts a power of the example wireless signal within a frequency range from f+0 to f+n and through a time frame from t+0 to t+m. Here, n and m are integers and correspond to, respectively, frequency bins and time steps. The graph represents the example wireless signal as a set of channel responses that include an individual channel response for each of the time steps. FIG. 3B presents a graph, in a frequency domain, of an example individual channel response for the example wireless signal of FIG. 3A. The individual responses have a magnitude of power for each of the frequency bins from f+0 to f+n. FIGS. 3A and 3B depict the individual channel responses as constant in magnitude and invariant in time. However, the magnitude of power for an individual channel response may vary between frequency bins, and the magnitude of power for individual frequency bins may vary as time progresses through the time steps. Although FIGS. 4A and 4B depict the magnitude of power for and individual channel response as continuous across the frequency bins, the magnitude may also be discontinuous. For example, the magnitude of power may include discrete points of magnitude across the frequency range such that one or more points of magnitude reside in each frequency bin.

Figure 3C:
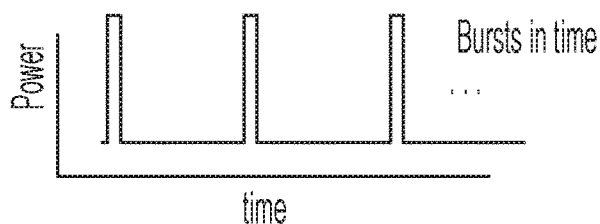
FIG. 3C is a graph, in a time domain for multiple time steps, of burst portions of the example wireless signal of FIG. 3A.

FIG. 3C presents a graph, from a time perspective, of a portion of the example wireless signal of FIG. 3A for multiple time steps. Each time step corresponds to a burst of electromagnetic power associated with an individual channel response of the set of channel responses. The burst of electromagnetic power may be centered about an individual time step. For example, FIG. 3C depicts the wireless signal as having three such bursts, which are centered about respective time steps of t+2, t+3, and t+4. However, other numbers and positions of time steps are possible for the example wireless signal.

The set of channel responses (or set of channel response data) may then be processed to generate a time series of statistical parameters. For example, the set of channel responses may be processed according to Equation (6) to generate a time series of means, represented by M:

$$M_{t+1} = \frac{1}{n} \sum_{k=0}^{n} [H_{t+1}(f+k) - H_t(f+k)] \qquad (6)$$

Here, H represents a magnitude of electromagnetic power within a frequency bin, f+k, and the term in brackets represents a difference in that magnitude as the wireless signal progresses in time between a pair of adjacent time steps, i.e., t→t+1. This difference, when determined for each frequency bin from f+0 to f+n, captures an evolution of the wireless signal between the pair of adjacent time steps. Equation (6) averages the difference for each frequency bin by dividing their sum by the number of frequency bins, n, thereby yielding a mean, $M_{t+1}$. The mean characterizes a statistical distribution of the differences, and may be determined for each pair of adjacent time steps in the time frame to generate a time series of means, e.g., $M_{t+1}$, $M_{t+2}$, $M_{t+3}$, ..., $M_{t+m}$. Although Equation (6) produces a mean to characterize the statistical distribution, other statistical parameters are possible, e.g., a standard deviation, a range or spread, a skewness, a kurtosis, and so forth. Moreover, the statistical distribution may be based on mathematical operations (or combinations thereof) other than a difference, such as a sum, a product, and a quotient.

The time series of statistical parameters may be used to determine motion zones in a space between wireless communication devices as well as motion-zone parameters characterizing each motion zone. In some implementations, sets of channel response data are obtained over a time frame that are based on wireless signals communicated over wireless links. The wireless signals traverse through a space between the wireless communication devices. The sets of channel response data include one set of channel response data for each wireless link. A time series of statistical parameters may be generated for each wireless link based on a respective set of channel response data. The time series of statistical parameters characterize a statistical distribution of the respective set of channel response data at successive points of time in the time frame.

A motion zone may be determined in the space based on changes in a time series of statistical parameters for a wireless link. For example, a time series of standard deviations may be analyzed in a time frame to determine if a magnitude of the standard deviation increases or decreases by more than 30 percent within the time frame. In another example, a standard deviation may be determined for a time series of means in a time frame. The time series of means may then be analyzed to determine points in time where their magnitude increases or decreases outside of the standard deviation. In these instances, a time boundary may be associated in the time frame with each change in magnitude of the time series of statistical parameters.

Figure 4:
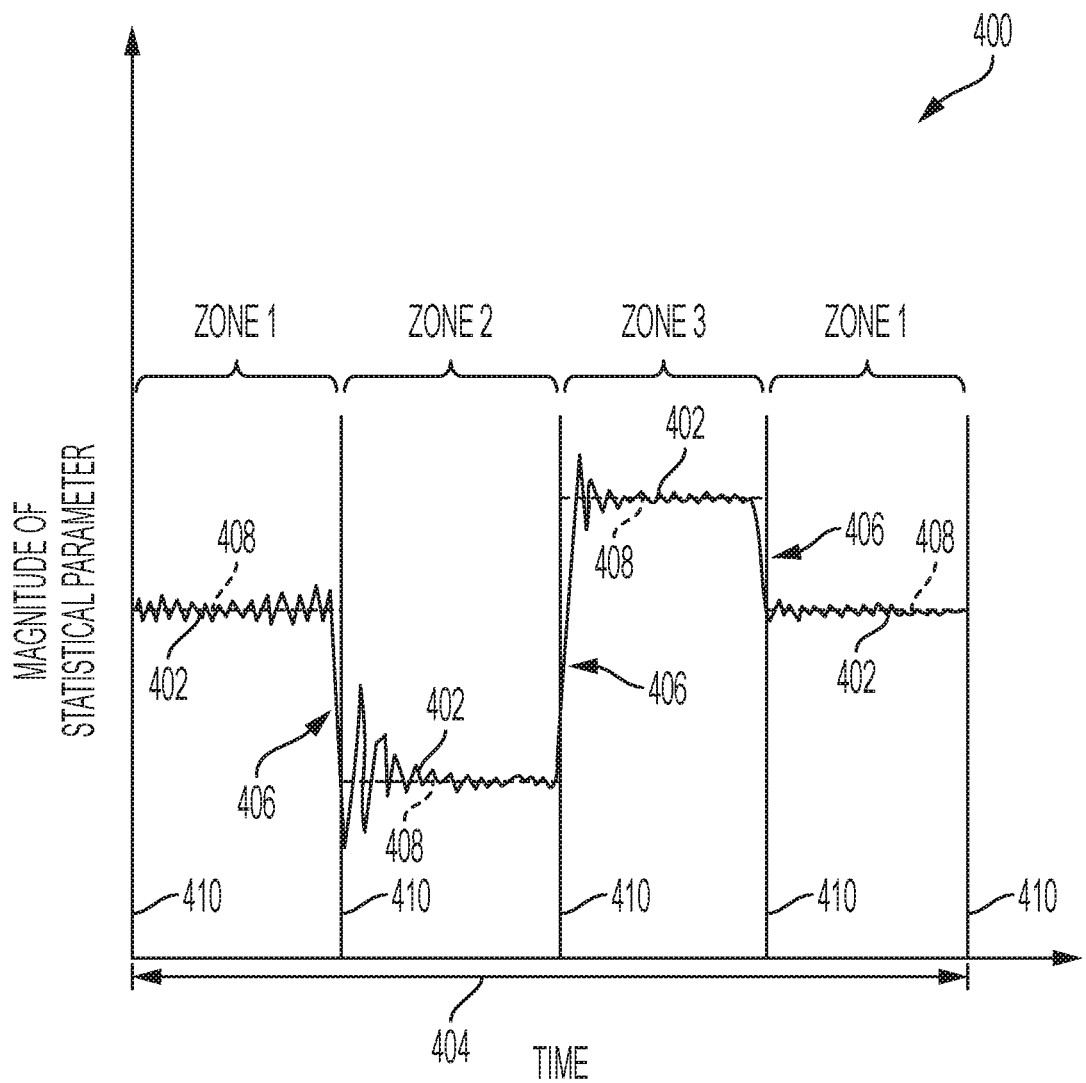
FIG. 4 is a graph showing an example time series of statistical parameters in a time frame for a wireless link.

FIG. 4 presents a graph 400 showing an example time series of statistical parameters 402 in a time frame 404 for a wireless link. The example time series of statistical parameters 402 is depicted in FIG. 4 as a continuous line. However, example time series of statistical parameters 402 may be represented by a discrete series of data points. The time series of statistical parameters 402 may include one or more changes in magnitude 406 greater than a predetermined amount, e.g., changes greater than a standard deviation about a mean 408. A time boundary 410 is associated with each of the changes in magnitude 406 within the time frame 404. Adjacent pairs of time boundaries 410 in the time series of statistical parameters 402 may be used to determine time intervals for respective motion zones. In particular, a motion zone may be assigned to each portion of the time series of statistical parameters 402 within a respective time interval. FIG. 4 depicts the time series of statistical parameters 402 as having four time intervals and four corresponding motion zones, three of which, are unique. However, other numbers of time intervals and corresponding motion zones are possible. Moreover, the time intervals need not be the same duration, and may be of differing duration.

Although FIG. 4 depicts a time series of statistical parameters for a single wireless link, multiple time series of statistical parameters and respective wireless links are possible. In these instances, each of time series of statistical parameters may be analyzed to determine motion zones in the space. In particular, a plurality of motion zones may be determined in the space based on changes in a time series of statistical parameters for each wireless link. For example, if a single wireless link does not "see" a motion zone uniquely, e.g., a magnitude of a statistical parameter from one time interval is approximately equal to a magnitude of a statistical parameter from another time interval, data from other wireless links may be analyzed. In particular, analysis of a time series of statistical parameters from the single wireless link may be supplemented by analysis of one or more additional time series of statistical parameters from other, respective wireless links. The determination of unique motion zones is discussed further in relation to FIGS. 7A-7B and 8. In some instances, the time series of statistical parameters for each wireless link includes a mean. In some instances, the time series of statistical parameters for each wireless link includes a standard deviation.

In some implementations, determining the plurality of motion zones includes identifying one or more time series of statistical parameters that change in magnitude greater than a predetermined amount within the time frame. A time boundary in the time frame is associated with each change in magnitude of the one or more time series of statistical parameters. Time intervals are determined by identifying adjacent pairs of time boundaries that share a common time series of statistical parameters, such as described in relation to FIG. 4. Motion zones may then be assigned to each portion of the one or more time series of statistical parameters within a respective time interval. An individual motion zone may be common to more than one of the one or more time series of statistical parameters (or respective wireless links). The motion zones collectively define the plurality of motion zones.

Sets of motion-zone parameters may be generated to characterize respective motion zones of the plurality of motion zones. Each set of motion-zone parameters is generated from portions of a time series of statistical parameters bounded by respective time intervals and associated with a single motion zone. For example, and with reference to Equation (6), the time series of means, M, may be used to generate a motion-zone parameter, $\bar{x}_p$, according to Equation (7):

$$\bar{x}_p = \frac{1}{m}\sum_{k=i}^{j} M_{t+k} \tag{7}$$

Here, the motion-zone parameter, $\bar{x}_p$, is a second mean determined for values of k that correspond to a time interval, t+i→t+1. The time interval bounds a portion of the time series of means, M, assigned to a motion zone, and the second mean, $\bar{x}_p$, characterizes a statistical distribution of the portion within the time interval, t+i→t+1. The second mean, $\bar{x}_p$, may be generated for each portion of the time series of means, M, bounded by a time interval and assigned a motion zone. For multiple wireless links, generation of the second mean, $\bar{x}_p$, may extend to a plurality of such time series. The resulting motion-zone parameters, $\bar{x}_p$, may then be grouped, on a motion-zone basis, to define sets of motion-zone parameters for respective motion zones.

Although Equation (7) utilizes a mean to characterize the time series of means, M, other types of motion-zone parameters are possible, e.g., a standard deviation, a range or spread, a skewness, a kurtosis, and so forth. Moreover, more than one motion-zone parameter may be used to characterize a portion of the time series of statistical parameters (e.g., three, four, seven, etc.). The motion-zone parameters may also characterize a time series of statistical parameters other than a time series of means.

In some implementations, generating the sets of motion-zone parameters includes generating a motion-zone parameter for each portion of the one or more time series of statistical parameters assigned a motion zone. The motion-zone parameters characterize a statistical distribution of the portion within a respective time interval. In these implementations, generating the sets of motion-zone parameters also includes identifying motion-zone parameters associated with a common motion zone, thereby defining a set of motion-zone parameters.

Figure 5:
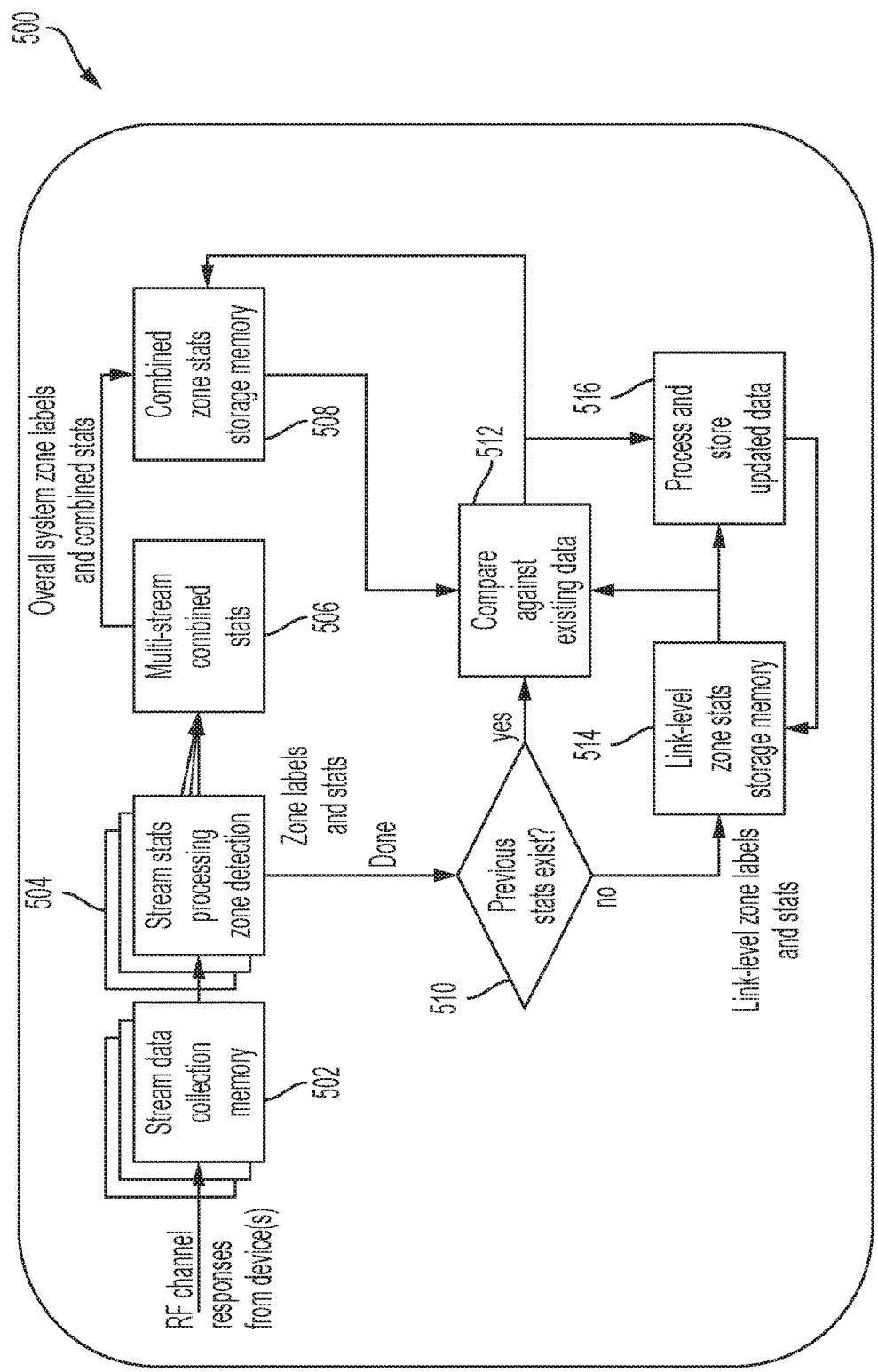
FIG. 5 is a flow chart showing an example process to determine one or more motion zones performed, for example, by a motion detection system.

Now referring to FIG. 5, a flow chart is presented showing an example process 500 to determine one or more motion zones performed, for example, by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 500 may be performed by a remote computer system (e.g., a server in the cloud), a wireless communication device (e.g., one or more of the wireless communication devices), or another type of system. For example, operations in the example process 500 may be performed by one or more of the example wireless communication devices 102A, 102B, 102C in FIG. 1.

The example process 500 may include additional or different operations, and the operations may be performed in the order shown or in another order. In some cases, one or more of the operations shown in FIG. 5 can be implemented as processes that include multiple operations, sub-processes or other types of routines. In some cases, operations can be combined, performed in another order, performed in parallel, iterated, or otherwise repeated or performed in another manner.

The example process 500 may collect channel responses for each wireless link (or stream). The channel responses may be stored in a first memory of the motion detection system, which may represent a stream data collection memory as shown by block 502. Each wireless link is defined by a unique pair of transmitting and receiving antennas. As part of collecting the channel responses, the example process 500 may include obtaining, over a time frame, sets of channel response data based on wireless signals communicated over wireless links (or streams) through a space between wireless communication devices. The sets of channel response data include one set of channel response data for each wireless link.

The example process 500 may also process the channel responses for each wireless link (or stream) to generate motion zones and respective sets of motion-zone parameters, as shown by operation 504. This operation produces, for each wireless link, a vector that has entries for each generated motion zone. Each entry of the vector corresponds to a motion-zone label and includes a set of corresponding motion-zone parameters. The example process 500 may receive the vectors as an output from operation 504 and combine them to form a matrix, as shown by operation 506. The matrix may be subsequently input into a memory of the motion detection system. The example process 500 then stores all motion zones identified by the motion detection system for all operational time frames along with their corresponding sets of motion-zone parameters. The motion zones and corresponding sets of motion-zone parameters may be stored in a second memory of the motion detection system, which may represent a combined zone stats storage memory as shown by block 508.

As part of operations 504-506, the example process 500 may generate a time series of statistical parameters for each wireless link based on a respective set of channel response data. The time series of statistical parameters characterize a statistical distribution of the respective set of channel response data at successive points of time in the time frame. The example process 500 may also determine a plurality of motion zones in the space based on changes in the time series of statistical parameters for each wireless link. Sets of motion-zone parameters are then generated that characterize respective motion zones of the plurality of motion zones. Each set of motion-zone parameters is generated from portions of a time series of statistical parameters bounded by respective time intervals. The example process 500 may additionally store, in a database of the motion detection system, the plurality of motion zones and sets of motion-zone parameters. The database of the motion detection system may include the combined zone stats storage memory of 508. In a subsequent operation (not shown), the process 500 may use the sets of motion-zone parameters to identify one of the plurality of motion zones based on a motion event detected by the motion detection system.

After completing operations 504-506, the example process 500 determines if any statistical information from a prior time frame corresponds to a motion zone detected in a subsequent time frame, as shown by interrogatory 510. If yes, the example process 500 proceeds to determine if the detected motion zone has been previously identified by the motion detection system, as shown by operation 512. In doing so, the example process 500 may compare a set of motion-zone parameters generated for the detected motion zone against sets of motion-zone parameters stored in the combined zone stats storage memory. If not, then the vector for each wireless link is stored in a third memory of the motion detection system, which may represent a link-level zone stats storage memory as shown by block 514.

As part of interrogatory 510 and operation 512, the generated set of motion-zone parameters may be analyzed to determine if the detected motion zone is a new motion zone. If the generated set of motion-zone parameters is sufficiently different from any set of motion-zone parameters stored in the combined zone stats storage memory, the example process 500 identifies the detected motion zone to be a new motion zone, as shown by operation 516. In particular, the example process 500 may execute program instructions to update the combined zone stats storage memory with an identity of the new motion zone and its corresponding set of motion-zone parameters. The example process 500 may also execute program instructions to add a new entry to each of the vectors stored in the link-level zone stats storage memory. The new entry may include a motion-zone label for the new motion-zone and its corresponding set of motion-zone parameters.

Alternatively, as part of interrogatory 510 and operation 512, the generated set of motion-zone parameters may be analyzed to determine if the detected motion zone is a known motion zone. If the generated set of motion-zone parameters is sufficiently similar to any set of motion-zone parameters stored in the combined zone stats storage memory, the example process 500 identifies the detected motion zone as a known motion zone. If the generated set of motion-zone parameters is not exactly the same as the any set of motion-zone parameters, but within a predetermined tolerance, the example process 500 may refresh one or both of the combined zone stats storage memory and the link-level zone stats storage memory with the generated set of motion-zone parameters, as shown by operation 516. In particular, the example process 500 may execute program instructions to replace the set of motion-zone parameters for the known motion zone in the combined zone stats storage memory with the generated set of motion-zone parameters. The example process 500 may also execute program instructions replace the set of motion-zone parameters associated with the known motion zone in each vector stored in the link-level zone stats storage memory with the generated set of motion-zone parameters.

The example process 500 depicted in FIG. 5 may be conducted over iterations of time frames. For example, the iterations may include a subsequent time frame occurring after the time frame (or prior time frame). As part of the operations described above, the example process 500 may repeat, over the subsequent time frame, operations of obtaining sets of channel response data, generating a time series of statistical parameters, determining a plurality of motion zones, generating sets of motion-zone parameters, storing the plurality of motion zones, and using the sets of motion-zone parameters. The example process 500 may also determine a difference by comparing the sets of motion-zone parameters from the subsequent time frame with the sets of motion zone parameters from the prior time frame. The example process 500 may also update, in the database of the motion detection system, one or both of the plurality of motion zones and the sets of motion zone parameters based on the difference. The database of the motion detection system may be stored, in part, in the stream data collection memory 502, the combined zone stats storage memory 508, and the link-level zone stats storage memory 514.

In some instances, when the example process 500 determines the difference, the example process 500 identifies a new motion zone and a new respective set of motion-zone parameters. Moreover, when the example process 500 updates one or both of the plurality of motion zones and the sets of motion zone parameters, the example process 500 then adds the new motion zone and the new respective set of motion-zone parameters to the database of the motion detection system.

In some instances, when the example process 500 determines the difference, the example process 500 identifies a motion zone present in the database at the end of both the subsequent and prior time frames. The motion zone is associated with a subsequent set of motion-zone parameters at the end of the subsequent time frame and a prior set of motion-zone parameters at the end of the prior time frame. The example process 500 then determines a difference between the subsequent and prior sets of motion-zone parameters. Moreover, when the example process 500 updates one or both of the plurality of motion zones and the sets of motion zone parameters, the example process 500 replaces, based on the difference, the prior set of motion-zone parameters in the database with the subsequent set of motion-zone parameters.

The example process 500 may determine motion zones and respective sets of motion-zone parameters that are catalogued to define the database. The database, which may serve as a reference database, may be compiled over a time frame sufficiently long for all motion zones in the space to be determined and characterized by statistical information. In some variations, the time frame occurs over at least a 20-minute duration (e.g., 30 minutes, 1 hour, 2 hours, 6 hours, etc.). The example process 500 may compile the database with motion present during at least a portion of the time frame, or alternatively, with no motion present during the time frame. The database, once compiled, may be accessed by subsequent processes to help identify, on a short time frame, one or more motion zones in which detected motion occurs. A duration of the short time frame may be sufficient to allow a few samples (e.g., 2-5) of statistical information to be determined, and in some instances, a few tens of samples (e.g., 20-60) of statistical information to be determined. In some variations, the short time frame is no greater than 30 seconds (e.g., 1 second, 3 seconds, 10 seconds, 20 seconds, etc.).

For example, a short time frame may be one second. For each second, the example process 500 may analyze statistical information, such as a time series of statistical parameters for a wireless link, to produce ten samples of statistical information. The ten samples of statistical information may define a set of motion-zone parameters for the short time frame. In another example, a long time frame may be one hour (or 3,600 seconds). For each second, the example process 500 may analyze statistical information, such as a time series of statistical parameters for a wireless link, to produce 36,000 samples of statistical information. The 36,000 samples of statistical information may define a set of motion-zone parameters for the long time frame, and may also allow the example process 500 determine a motion zone associated with the set of motion-zone parameters.

Figure 6:
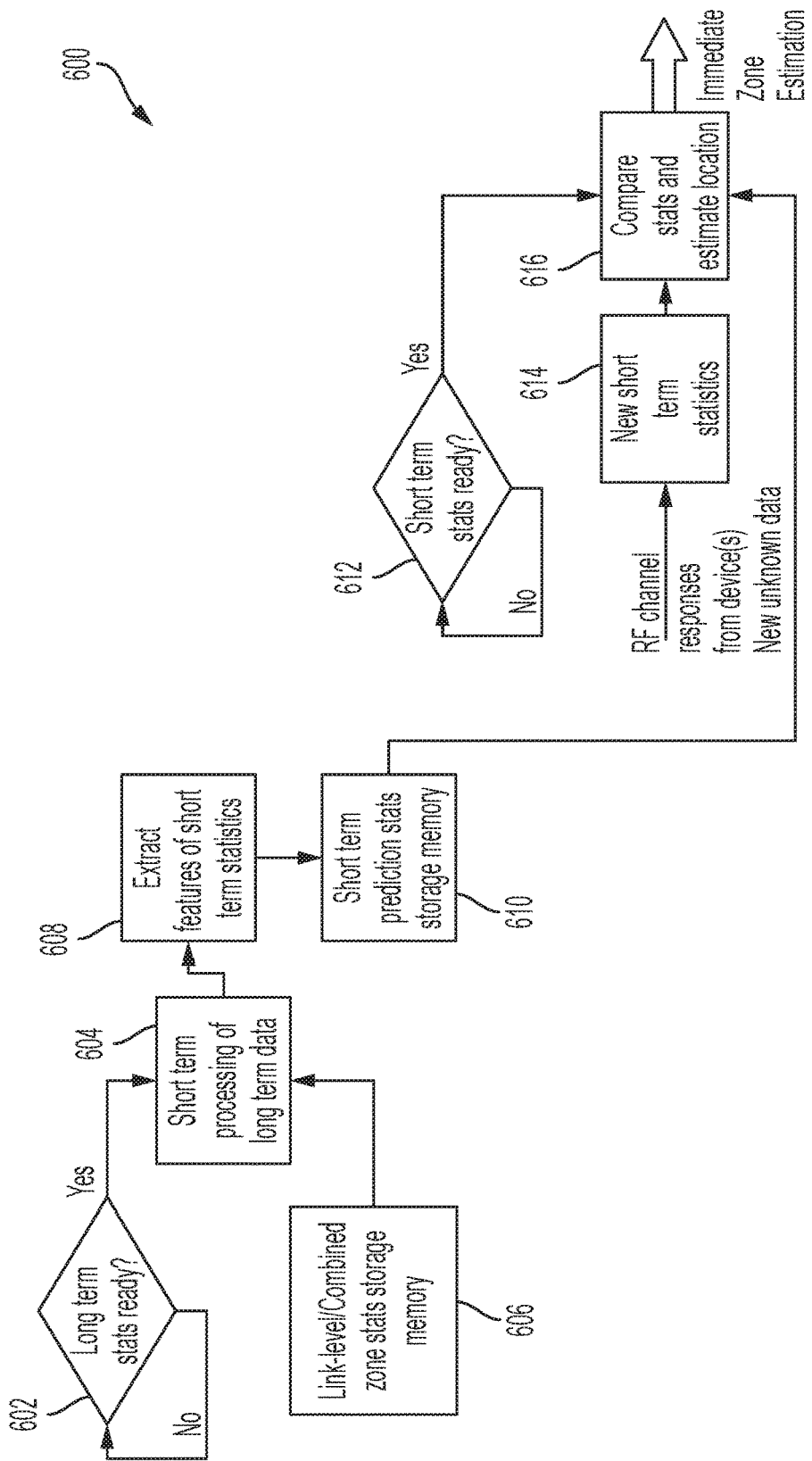
FIG. 6 is a flow chart showing an example process to identify one or more motion zones in which detected motion occurs.

Now referring to FIG. 6, a flow chart is presented showing an example process 600 to identify one or more motion zones in which detected motion occurs. The example process 600 may occur within a time frame than that of example process 500, and may be performed by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 600 may be performed by a remote computer system (e.g., a server in the cloud), a wireless communication device (e.g., one or more of the wireless communication devices), or another type of system. For example, operations in the example process 600 may be performed by one or more of the example wireless communication devices 102A, 102B, 102C in FIG. 1.

The example process 600 may include additional or different operations, and the operations may be performed in the order shown or in another order. In some cases, one or more of the operations shown in FIG. 6 can be implemented as processes that include multiple operations, sub-processes or other types of routines. In some cases, operations can be combined, performed in another order, performed in parallel, iterated, or otherwise repeated or performed in another manner.

The example process 600 confirms that a database of long-term statistical information, such as the databased described in relation to example process 500 of FIG. 5, is fully compiled and ready for access, as shown by interrogatory 602. If confirmed, the example process may execute program instructions to process the database of long-term statistical information using a short-term window, as shown by operation 604. If not confirmed, the example process 600 may pause until the database of long-term statistical information if fully compiled and ready for access. The example process 600 may invoke another process—e.g., process 500 of FIG. 5—to compile (or finish compiling) the database of long-term statistical information.

At operation 604, the example process 600 accesses the database of long-term statistical information, which may include accessing one or both of the combined zone stats storage memory and the link-level zone stats storage memory, as shown by block 606. The example process 600 then extracts features of short-term statistical information, as shown by operation 608, by stepping through the database of long-term statistical information on a sliding-window basis. The sliding window basis may correspond to multiple time windows within a time interval of the long-term statistical information and yield several samples of statistical information per time window. The samples of statistical information may include ranges of motion-zone parameters for respective motion zones within a time window. The ranges of motion-zone parameters may be based on any type of statistical parameter, such as a mean, a standard deviation, a skewness, a kurtosis, and so forth.

The example process 600 may then store the samples of statistical information (with their respective motion zones) within a memory of the motion detection system, which may represent a short-term prediction stats storage memory as shown by block 610. The samples of statistical information and respective motion zones may define a database of short-term statistical information.

As part of operations 604 and 608, the example process 600 may obtain a time series of statistical parameters derived from sets of channel response data. The channel response data based on wireless signals communicated over wireless links through a space between wireless communication devices. The example process 600 may also identify time intervals in the time series of statistical parameters. Each time interval is associated with a respective motion zone in the space. In some instances, the example process 600 generates sets of motion-zone parameters characterizing respective motion zones. Each set of motion-zone parameters is generated from portions of a time series of statistical parameters bounded by respective time intervals.

Moreover, as part of operations 604 and 608, the example process 600 may determine, by analyzing multiple time windows within each of the time intervals, ranges of motion-zone parameters associated with each respective motion zone. In some instances, the multiple time windows overlap. In some instances, the multiple time windows do not overlap. The example process 600 may then store, in a database of a motion detection system, the ranges of motion-zone parameters for the respective motion zones. In a subsequent operation, which is described in further detail below, the example process 600 uses the ranges of motion-zone parameters to identify one of the motion zones based on a motion event detected by the motion detection system.

In completing operations 604 and 608, the example process 600 may recreate what happens on the motion detection system when processing future incoming, but unknown short-term data. By recreating conditions encountered during a short-term prediction, but using the known long-term statistical information, the example process 600 can evaluate detailed short-term statistical distributions of long-term statistical information. Such evaluation may allow the example process 600 to prepare an algorithm for all short-term statistical variations observed by the motion detection system. The algorithm may help the example process 600 rapidly identify one or more motion zones in which detected motion occurs.

At interrogatory 612, the example process 600 confirms that the database of short-term statistical information is fully compiled and ready for access. Once confirmed, the example process 600 collects channel responses for each wireless link (or stream). The channel responses may reflect motion detected by the motion detection system in a space between wireless communication devices (e.g., a motion event). In a sub-process analogous to operations 502-506 of FIG. 5, the example process 600 generates short-term statistical data for each known motion zone, as shown by operation 614. The short-term statistical data may include a time series of statistical information, a set of motion-zone parameters, and so forth.

The example process 600 then executes program instructions to compare the short-term statistical data for each known motion zone to that stored in the database of short-term statistical information, as shown by operation 616. Such a comparison may involve comparing ranges of the short-term statistical data to ranges of the short-term statistical information stored in the database for each known motion zone. If the short-term statistical data is sufficiently similar to short-term statistical information associated with one or more motion zones in the database, e.g., within a predetermined tolerance, the example process 600 identifies the one or more motion zones as a location where the detected motion occurs. Such identification may correspond to an immediate estimation of motion zones for the detected motion.

As part of operations 604 and 608, the example process 600 uses ranges of motion-zone parameters to identify one of the motion zones based on a motion event detected by the motion detection system. The example process 600 may analyze the ranges of motion-zone parameters to identify, for one or more of the motion zones, overlapping ranges of motion-zone parameters and non-overlapping parameter ranges of motion-zone parameters. In some instances, the ranges of motion-zone parameters include upper bounds and lower bounds of means associated with respective motion zones. In some instances, the ranges of motion-zone parameters include upper bounds and lower bounds of standard deviations associated with respective motion zones.

Moreover, as part of operations 604 and 608, the example process 600 may generate motion-zone parameters for the motion event (or detected motion) based on a time series of statistical parameters produced in response to the motion event. The example process 600 may then compare the motion-zone parameters to the ranges of motion-zone parameters for each respective motion zone, thereby identifying one of the motion zones as a location of the motion event. In some instances, the motion-zone parameters include a mean.

In some variations, the example process 600 executes program instructions to repeat the operations, over multiple iterations for respective time frames, of obtaining the time series of statistical parameters, identifying time intervals, determining ranges of motion-zone parameters, storing the ranges of motion-zone parameters, and using the ranges of motion-zone parameters. In these variations, the example process 600 determines a difference by comparing, from a subsequent time frame, subsequent ranges of motion-zone parameters with prior ranges of motion zone parameters from a prior time frame. The example process 600 also updates, in the database of the motion detection system, the ranges of motion-zone parameters for the respective motion zones based on the difference.

The databases of long- and short-term statistical information produced by respective processes 500 and 600 may be used to determine a contribution of each wireless link (or stream) to the one or more identified motion zones. In particular, a subsequent process may determine a contribution and overlap of each time series of statistical parameters to the one or more identified motion zones. The subsequent process may also determine a probability representing an extent to which short-term, but unknown statistical data from example process 600 correlates to the sets of motion-zone parameters associated with the one or more identified motion zones. A confidence level may then be determined that characterizes a degree to which motion detected by the motion detection system is within the one or more identified motion zones.

Figure 7A:
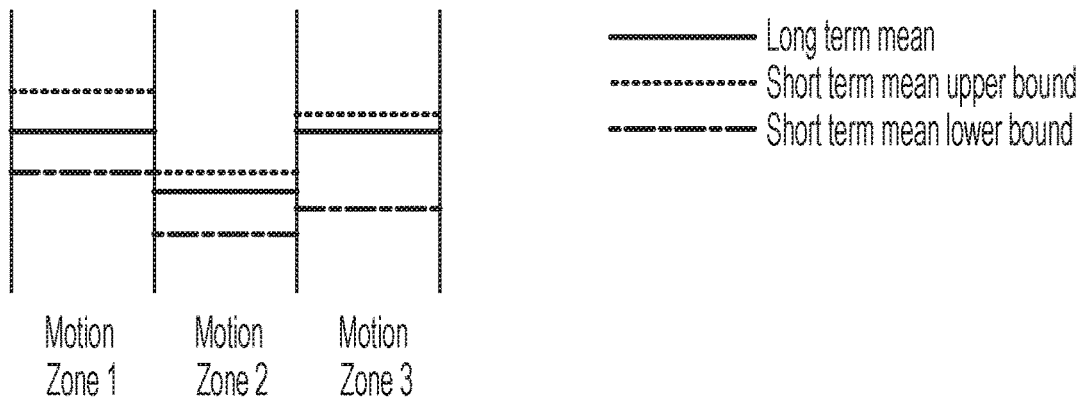
FIGS. 7A-7B are schematic diagrams of three example motion zones, each associated with long- and short-term means.

For example, FIG. 7A presents a schematic diagram of three example motion zones, each associated with long- and short-term means. The short-term means parameters are illustrated with upper and lower bounds defining a range. Although FIG. 7A illustrates the motion-zone parameter as a mean, other statistical parameters are possible (e.g., a standard deviation, a skewness, a kurtosis, etc.). The ranges of the respective short-term means may be compared to identify overlapping and non-overlapping ranges. The overlapping and non-overlapping ranges may determine bounds, exclusive to one or more motion zones, that allow unknown statistical data to be mapped to a motion zone with the confidence level.

Figure 7B:
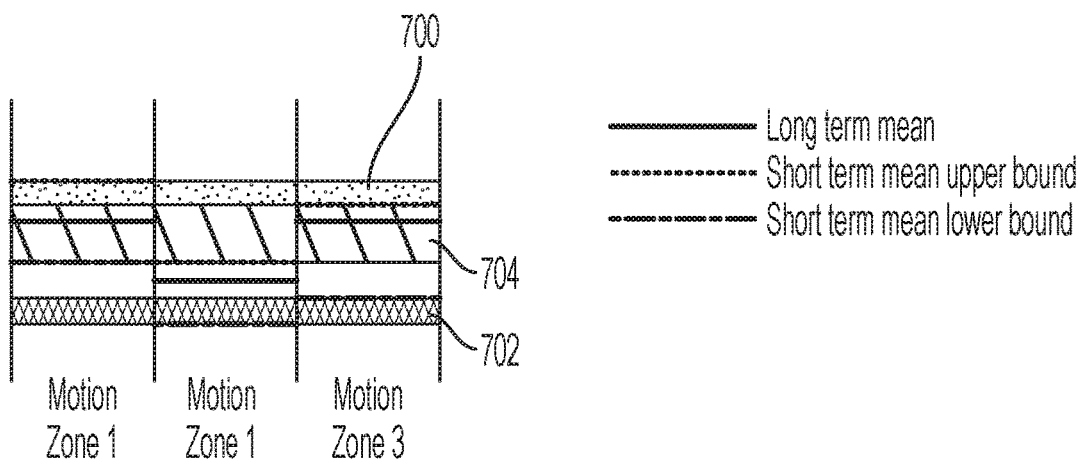

FIG. 7B presents the schematic diagram of FIG. 7A but with bounds exclusive to one or more of the three motion zones. In particular, a first bound 700 is exclusive to a non-overlapping range of short-term means associated with motion zone 3. Means generated from unknown statistical data falling within the first bound 700 have a 100% probability of representing the short-term means associated with motion zone 1. As such, for detected motion generating such unknown statistical data, a confidence level of 100% may be assigned to motion zone 1 as being a location for the detected motion. Similarly, a second bound 702 is exclusive to a non-overlapping range of short-term means associated with motion zone 2. Means generated from unknown statistical data falling within the second bound 702 have a 100% probability of representing the short-term means associated with motion zone 2. As such, for detected motion generating such unknown statistical data, a confidence level of 100% may be assigned to motion zone 2 as being a location for the detected motion. However, a third bound 704 is exclusive to the overlapping range of short-term means associated with motion zones 1 and 3. In this case, means generated from unknown statistical data falling within the third bound 704 have a 50% probability of representing the short-term means of motion zone 1 and a 50% probability of representing the short-term means of motion zone 1. As such, for detected motion generating such unknown statistical data, a confidence level of 50% may be assigned to each of motion zones 1 and 3 as being a location for the detected motion.

In some implementations, an example process for determining the confidence level includes obtaining, from a database of a motion detection system, ranges of motion-zone parameters associated with respective motion zones in a space between wireless communication devices. The ranges of motion-zone parameters are derived from sets of channel response data based on wireless signals communicated over wireless links through the space. The example process also includes analyzing the ranges of motion-zone parameters to identify, for one or more of the motion zones, overlapping ranges of motion-zone parameters and non-overlapping parameter ranges of motion-zone parameters. The overlapping and non-overlapping ranges of motion-zone parameters are stored in the database of the motion detection system. The example process additionally includes using the overlapping and non-overlapping ranges of motion-zone parameters to identify one of the motion zones based on a motion event detected by the motion detection system. In some instances, the example process includes generating motion-zone parameters for the motion event based on one or more time series of statistical parameters produced in response to the motion event. The example process may also include determining a confidence level, based on the motion-zone parameters, that characterizes a degree to which the identified motion zone represents a location of the motion event.

The example process may determine a statistical boundary between sets of motion-zone parameters, thereby generating non-overlapping ranges of motion-zone parameters. The statistical boundary may assist in determining a confidence level. For example, once the motion-zone parameters are known for all discovered motion zones and for all wireless links, such as found in the database of long-term statistical information, sets of motion-zone parameters for the respective motion zones may be classified through use of a support vector machine (SVM). Each motion zone represented in the database of long-term statistical information is treated as having unique data sets for its respective set of motion-zone parameters. A statistical boundary separating these unique data sets, such as a hyperplane, may also statistically separate the motion zones.

To determine the statistical boundary, the example process may pair of data according to:

$$(\bar{x}_1, y_1), \ldots, (\bar{x}_n, y_n)$$

Here $\bar{x}_n$ represents a motion-zone parameter (e.g., a mean, a standard deviation, a skewness, a kurtosis, etc.); $y_n$ represents a motion-zone label; and n represents a number of values in a unique data set. The example process may then generate a hyperplane using the support vector machine. The hyperplane may be generated according to Equation (8):

$$(\bar{w} \cdot \bar{x}) - \bar{x} = 0 \qquad (7)$$

Figure 8:
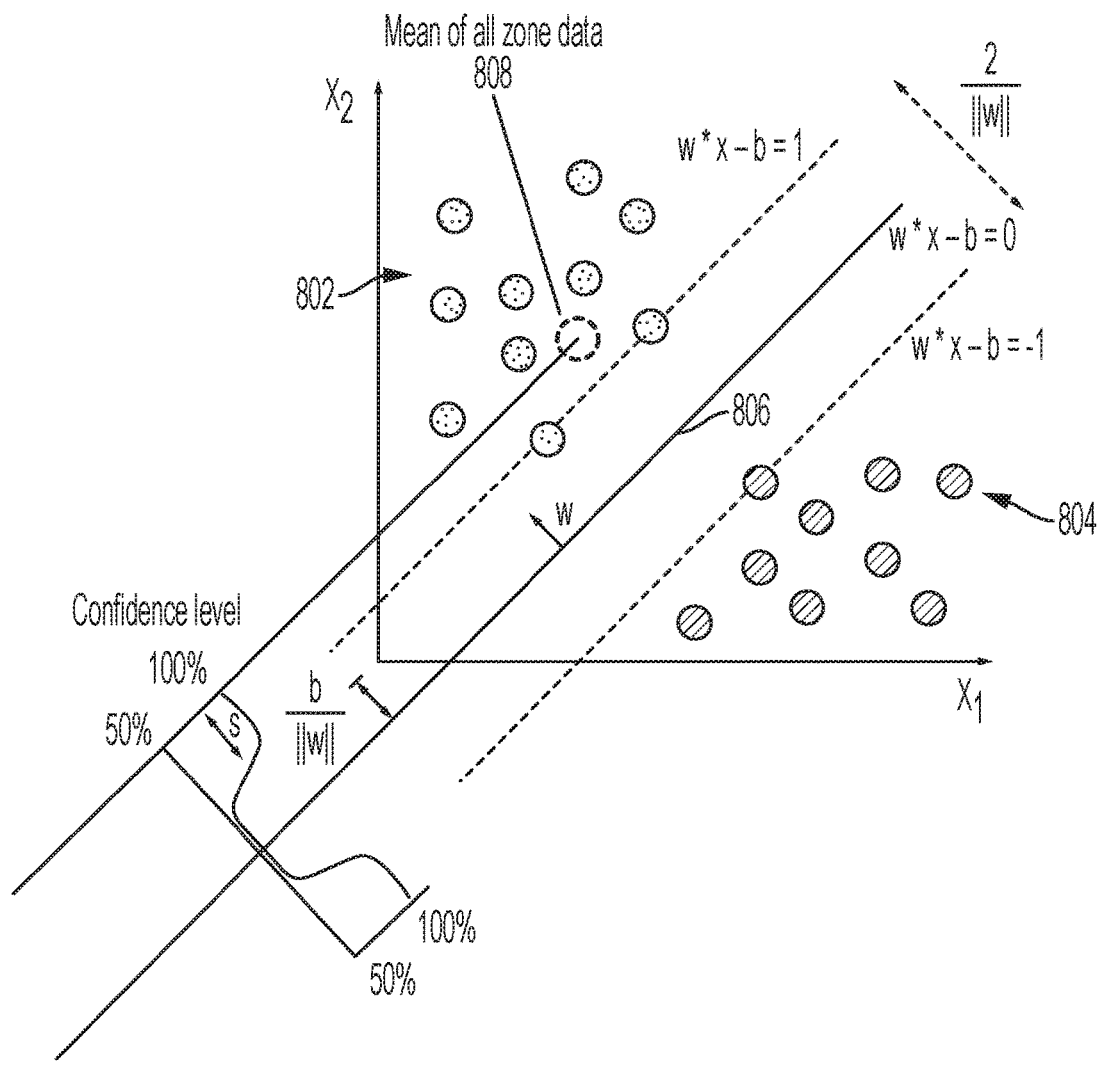
FIG. 8 is a graph of two data sets, separated by a hyperplane, that represent respective motion-zone parameters.

Here, $\bar{w}$ represents the hyperplane and $b/\|w\|$ is an offset of magnitude $\|w\|$ away from an origin, as shown in FIG. 8. FIG. 8 presents a graph of two data sets 800, 802, separated by a hyperplane 808, that represent respective motion-zone parameters. The hyperplane 806 is disposed between each data set such that distances are maximized from data points nearest the hyperplane from each data set. In FIG. 8, the nearest data points are disposed on dashed lines labeled $(\bar{w} \cdot \bar{x} = 1$ and $(\bar{w} \cdot \bar{x} = -1$.

The proximity of a motion zone to the hyperplane 806 may allow a confidence level to be determined a location of motion detected by the motion detection system. The proximity or distance may be defined in reference to a standard deviation, s, as calculated according to Equation (8):

$$s = \sqrt{\sum_{i=1}^{n} \frac{(x_i - \bar{x})^2}{n-1}} \qquad (8)$$

Here, $x_i$ represents a value of a unique data set; $\bar{x}$ represents a mean of the data set; and n represents a number of values in the unique data set. For example, if the hyperplane 806 is disposed at least one standard deviation away from a center (or mean) of a data set 808, a confidence level of 100% may be assigned to the motion zone, if determined as being the location of motion. However, the confidence level decreases as a distance between the center (or mean) of the data set 808 and the hyperplane 806 decrease. If the hyperplane 806 is disposed very close to the center (or mean) of the data set 808, the confidence level decreases to 50%. In this case, the motion zone associated with data set 802 may be identified as the location of motion, but a confidence level of 50% may be assigned to the motion zone.

In some implementations, determining the confidence level includes determining a statistical boundary between first values of motion-zone parameters associated with the identified motion zone and second values of motion-zone parameters associated with a second motion zone. The statistical boundary represents an equal confidence level of the motion event occurring in either the identified motion zone or the second motion zone. Determining the confidence level also includes determining a distance of the motion-zone parameters from the statistical boundary towards the first values. The distance, when increasing towards the first values, corresponds to an increasing confidence level that the identified motion zone represents the location of the motion event. In some instances, determining the statistical boundary includes using a support vector machine to determine a hyperplane between the first values and the second values.

In some implementations, the example process includes repeating the operations, over multiple iterations for respective time frames, of obtaining ranges of motion-zone parameters, analyzing the ranges of motion-zone parameters, storing the overlapping and non-overlapping ranges of motion-zone parameters, and using the overlapping and non-overlapping ranges of motion-zone parameters. In these implementations, the example process also includes determining a difference by comparing, from a subsequent time frame, subsequent overlapping and non-overlapping ranges of motion-zone parameters with prior overlapping and non-overlapping ranges of motion-zone parameters from a prior time frame. The example process additionally includes updating, in the database of the motion detection system, one or both of the overlapping and non-overlapping ranges of motion-zone parameters based on the difference.

In some implementations, the example process includes generating sets of motion-zone parameters characterizing respective motion zones, such as described in relation to example process 500 of FIG. 5. Each set of motion-zone parameters is generated from portions of a time series of statistical parameters bounded by respective time intervals, and each time series of statistical parameters is based on a respective set of channel response data. In some implementations, the example process includes determining, by analyzing multiple time windows within each of the time intervals, ranges of motion-zone parameters associated with each respective motion zone. The example process may determine the ranges of motion-zone parameters in a manner analogous to that described in relation to example process 600 of FIG. 6

Figure 9:
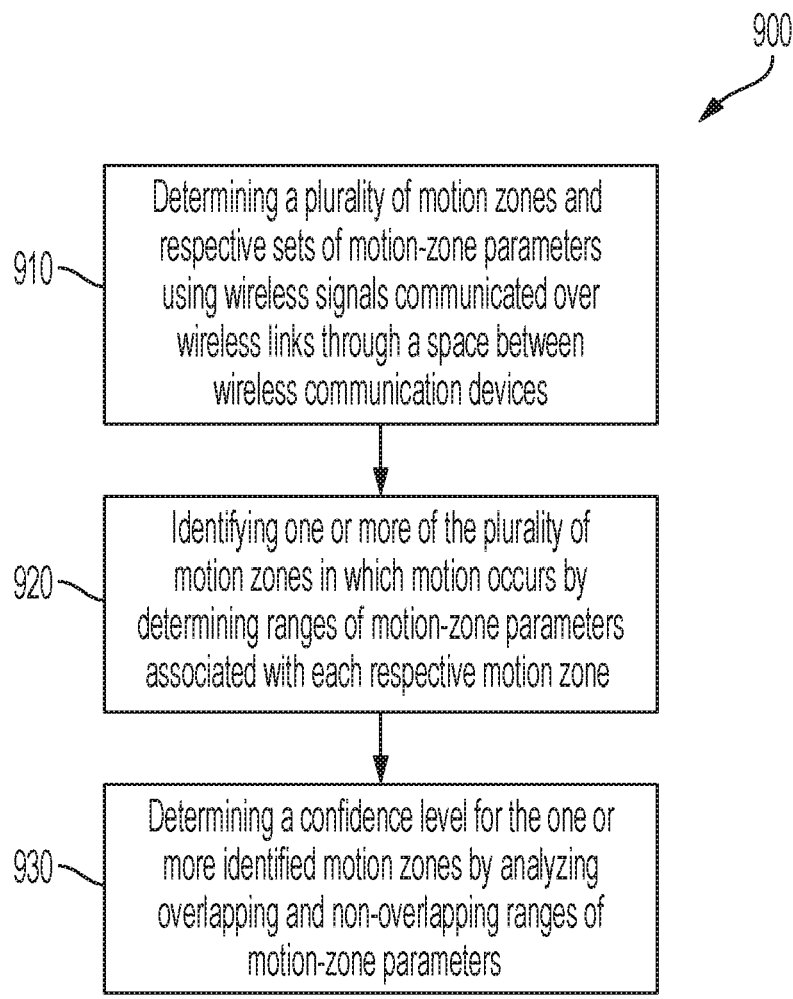
FIG. 9 is flow chart showing an example process to determine a location of motion in a space traversed by wireless signals.

Now referring to FIG. 9, a flow chart is presented showing an example process 900 to determine a location of motion in a space traversed by wireless signals. The example process 900 may be performed, for example, by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 900 may be performed by a remote computer system (e.g., a server in the cloud), a wireless communication device (e.g., one or more of the wireless communication devices), or another type of system. For example, operations in the example process 900 may be performed by one or more of the example wireless communication devices 102A, 102B, 102C in FIG. 1. A non-transitory computer-readable medium may also store instructions that are operable, when executed by data processing apparatus (e.g., the example wireless communication devices 102A, 102B, 102C in FIG. 1), to perform one or more operations of process 900.

The example process 900 may include additional or different operations, and the operations may be performed in the order shown or in another order. In some cases, one or more of the operations shown in FIG. 9 can be implemented as processes that include multiple operations, sub-processes or other types of routines. In some cases, operations can be combined, performed in another order, performed in parallel, iterated, or otherwise repeated or performed in another manner.

As shown by operation 910, the example process 900 includes determining a plurality of motion zones and respective set of motion-zone parameters using wireless signals communicated over wireless links through a space between wireless communication devices. The example process 900 may accomplish operation 910 by executing program instructions according to example process 1000 described in relation to FIG. 10. In doing so, the example process 900 may complete one or more processes detailed with respect to FIGS. 3A-3C, 4, and 5.

The example process 900 also includes identifying one or more of the plurality of motion zones in which motion occurs by determining ranges of motion-zone parameters associated with each respective motion zone, as shown by operation 920. The example process 900 may accomplish operation 920 by executing program instructions according to example process 1100 described in relation to FIG. 11. In doing so, the example process 900 may complete one or more processes detailed with respect to FIGS. 3A-3C and 4-6.

The example process 900 additionally includes determining a confidence level for the one or more identified motion zones by analyzing overlapping and non-overlapping ranges of motion-zone parameters, as shown by operation 930. The example process 900 may accomplish operation 930 by executing program instructions according to example process 1200 described in relation to FIG. 12. In doing so, the example process 900 may complete one or more processes detailed with respect to FIGS. 3A-3C, 4-6, 7A-7B, and 8.

Figure 10:
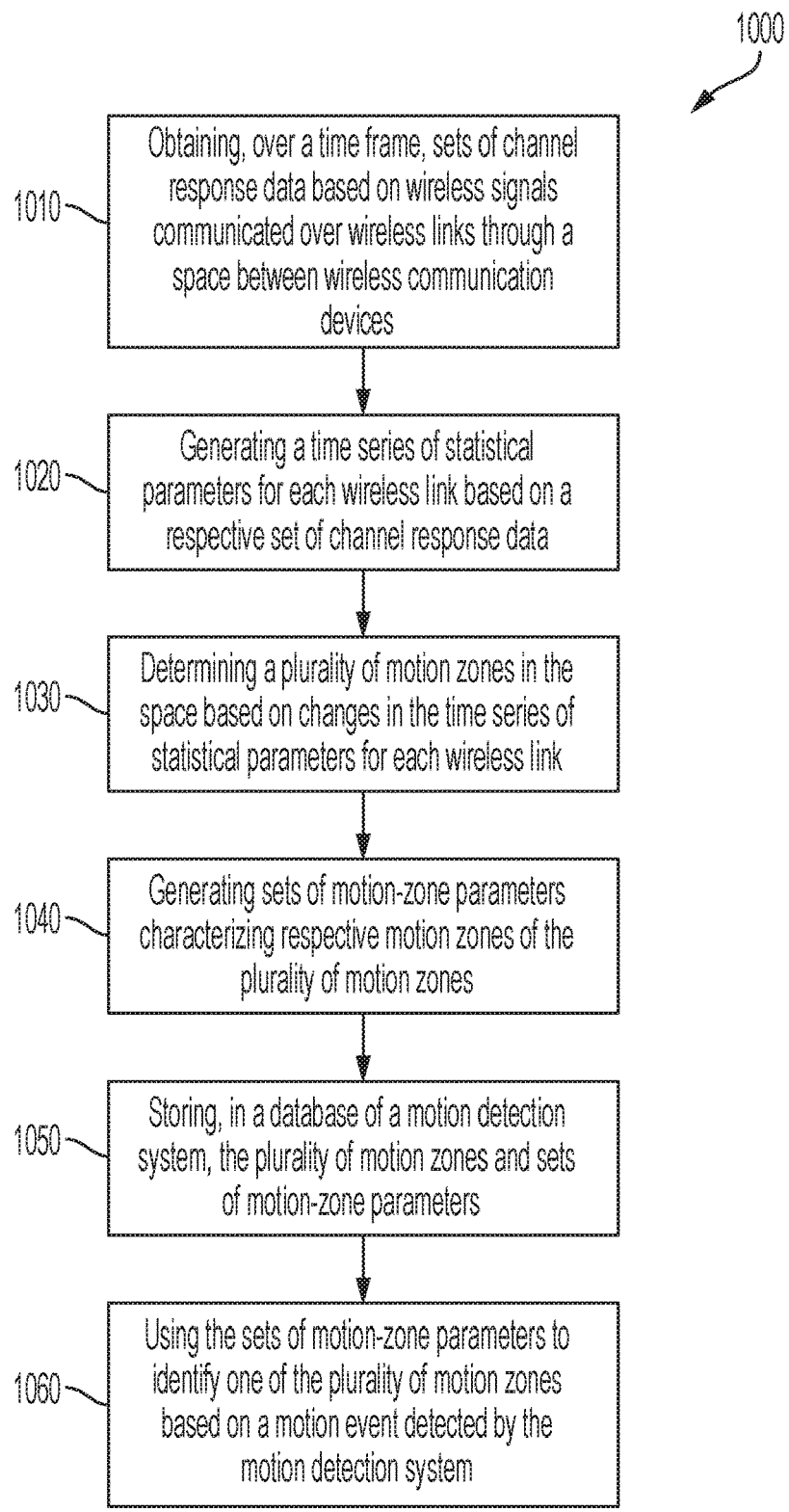
FIG. 10 is a flow chart showing an example process to determine a plurality of motion zones and respective set of motion-zone parameters.

Now referring to FIG. 10, a flow chart is presented showing an example process 1000 to determine a plurality of motion zones and respective set of motion-zone parameters. The example process 1000 may be performed, for example, by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 1000 may be performed by a remote computer system (e.g., a server in the cloud), a wireless communication device (e.g., one or more of the wireless communication devices), or another type of system. For example, operations in the example process 1000 may be performed by one or more of the example wireless communication devices 102A, 102B, 102C in FIG. 1. A non-transitory computer-readable medium may also store instructions that are operable, when executed by data processing apparatus (e.g., the example wireless communication devices 102A, 102B, 102C in FIG. 1), to perform one or more operations of process 1000.

The example process 1000 may include additional or different operations, and the operations may be performed in the order shown or in another order. In some cases, one or more of the operations shown in FIG. 10 can be implemented as processes that include multiple operations, sub-processes or other types of routines. In some cases, operations can be combined, performed in another order, performed in parallel, iterated, or otherwise repeated or performed in another manner.

As shown by operation 1010, the example process 1000 includes obtaining, over a time frame, sets of channel response data based on wireless signals communicated over wireless links through a space between wireless communication devices. The sets of channel response data include one set of channel response data for each wireless link. The example process 1000 also includes generating a time series of statistical parameters for each wireless link based on a respective set of channel response data, as shown by operation 1020. The time series of statistical parameters characterizes a statistical distribution of the respective set of channel response data at successive points of time in the time frame. A plurality of motion zones in the space is determined based on changes in the time series of statistical parameters for each wireless link, as shown by operation 1030. In some instances, the time series of statistical parameters for each wireless link includes a mean. In some instances, the time series of statistical parameters for each wireless link includes a standard deviation.

The example process 1000 additionally includes generating sets of motion-zone parameters that characterize respective motion zones of the plurality of motion zones, as shown by operation 1040. Each set of motion-zone parameters is generated from portions of a time series of statistical parameters bounded by respective time intervals. The example process 1000 further includes storing, in a database of a motion detection system, the plurality of motion zones and sets of motion-zone parameters, as shown by operation 1050. The sets of motion-zone parameters are used to identify one of the plurality of motion zones based on a motion event detected by the motion detection system, as shown by operation 1060.

In some implementations, the operation 1030 of determining the plurality of motion zones includes identifying one or more time series of statistical parameters that change in magnitude greater than a predetermined amount within the time frame. A time boundary in the time frame is associated with each change in magnitude of the one or more time series of statistical parameters. The operation 1030 may also include determining time intervals by identifying adjacent pairs of time boundaries that share a common time series of statistical parameters. Motion zones are assigned to each portion of the one or more time series of statistical parameters within a respective time interval. The motion zones collectively define the plurality of motion zones. In further implementations, the operation 1040 of generating sets of motion-zone parameters includes generating a motion-zone parameter for each portion of the one or more time series of statistical parameters assigned a motion zone. The motion-zone parameter characterizes a statistical distribution of the portion within a respective time interval. The operation 1040 also includes identifying motion-zone parameters associated with a common motion zone, thereby defining a set of motion-zone parameters.

In some implementations, the time frame is a prior time frame and the example process 1000 includes repeating, over a subsequent time frame, the operations of obtaining sets of channel response data, generating a time series of statistical parameters, determining a plurality of motion zones, generating sets of motion-zone parameters, storing the plurality of motion zones, and using the sets of motion-zone parameters. In these implementations, the example process 1000 includes determining a difference by comparing the sets of motion-zone parameters from the subsequent time frame with the sets of motion zone parameters from the prior time frame. The example process 100 also includes updating, in the database of the motion detection system, one or both of the plurality of motion zones and the sets of motion-zone parameters based on the difference.

In some variations, determining the difference includes identifying a new motion zone and a new respective set of motion-zone parameters. In these variations, updating one or both of the plurality of motion zones and the sets of motion-zone parameters includes adding the new motion zone and the new respective set of motion-zone parameters to the database of the motion detection system.

In some variations, determining the difference includes identifying a motion zone present in the database at the end of both the subsequent and prior time frames. The motion zone is associated with a subsequent set of motion-zone parameters at the end of the subsequent time frame and a prior set of motion-zone parameters at the end of the prior time frame. Determining the difference also includes determining a difference between the subsequent and prior sets of motion-zone parameters. In these variations, updating one or both of the plurality of motion zones and the sets of motion-zone parameters includes replacing, based on the difference, the prior set of motion-zone parameters in the database with the subsequent set of motion-zone parameters.

Figure 11:
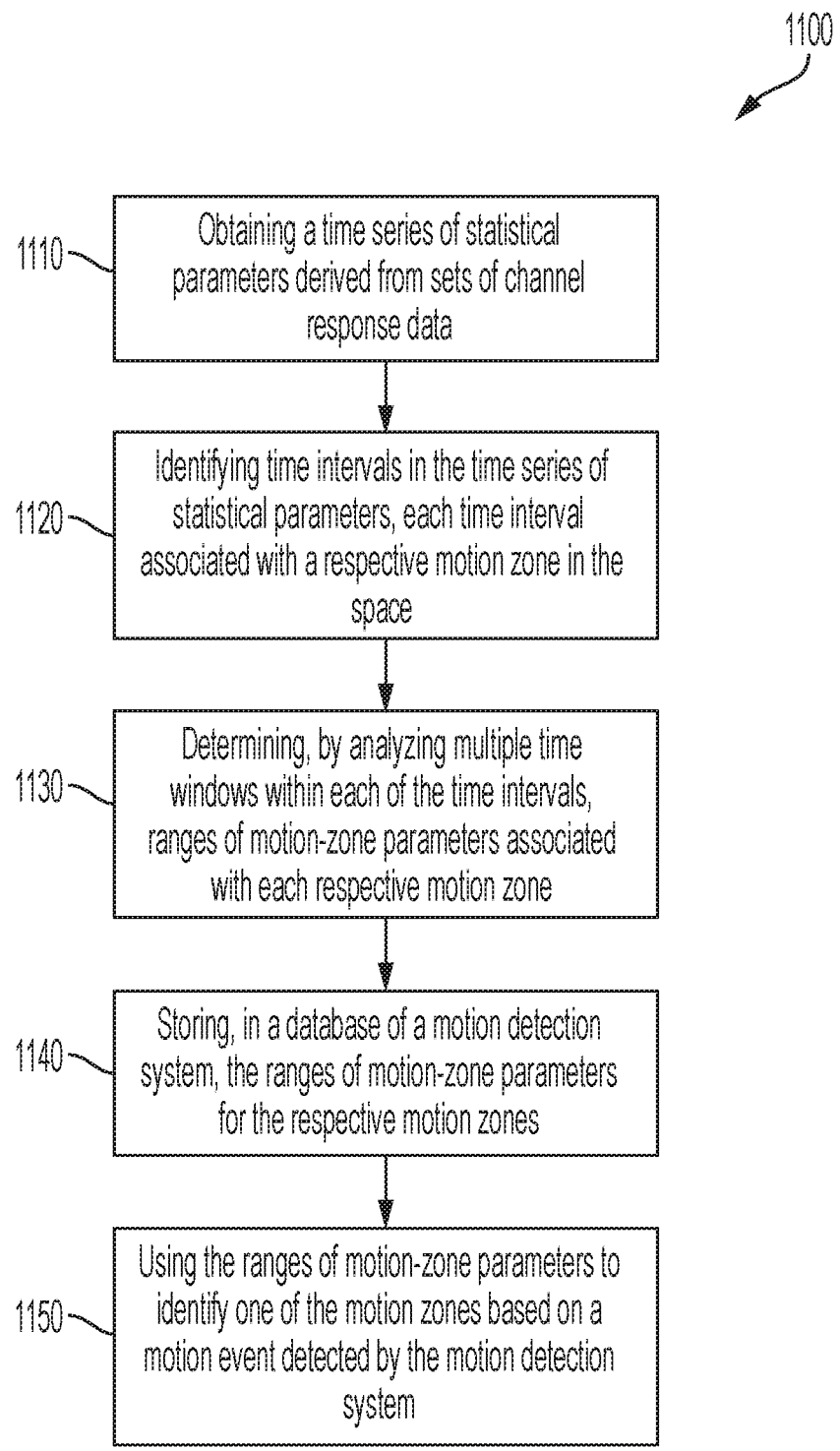
FIG. 11 is a flow chart showing an example process to identify one or more of a plurality of motion zones in which motion occurs.

Now referring to FIG. 11, a flow chart is presented showing an example process 1100 to identify one or more of a plurality of motion zones in which motion occurs. The example process 1100 may be performed, for example, by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 1100 may be performed by a remote computer system (e.g., a server in the cloud), a wireless communication device (e.g., one or more of the wireless communication devices), or another type of system. For example, operations in the example process 1100 may be performed by one or more of the example wireless communication devices 102A, 102B, 102C in FIG. 1. A non-transitory computer-readable medium may also store instructions that are operable, when executed by data processing apparatus (e.g., the example wireless communication devices 102A, 102B, 102C in FIG. 1), to perform one or more operations of process 1100.

The example process 1100 may include additional or different operations, and the operations may be performed in the order shown or in another order. In some cases, one or more of the operations shown in FIG. 11 can be implemented as processes that include multiple operations, sub-processes or other types of routines. In some cases, operations can be combined, performed in another order, performed in parallel, iterated, or otherwise repeated or performed in another manner.

As shown by operation 1110, the example process 1100 includes obtaining a time series of statistical parameters derived from sets of channel response data. The channel response data is based on wireless signals communicated over wireless links through a space between wireless communication devices. The example process 1100 also includes identifying time intervals in the time series of statistical parameters, as shown by operation 1120. Each time interval is associated with a respective motion zone in the space. The example process 1100 additionally includes determining, by analyzing multiple time windows within each of the time intervals, ranges of motion-zone parameters associated with each respective motion zone, as shown by operation 1130. In some instances, the multiple time windows overlap. In some instances, the multiple time windows do not overlap. The example process 1100 further includes storing, in a database of a motion detection system, the ranges of motion-zone parameters for the respective motion zones, as shown by operation 1140. The ranges of motion-zone parameters are used to identify one of the motion zones based on a motion event detected by the motion detection system, as shown by operation 1150.

In some implementations, the example process 1100 includes generating sets of motion-zone parameters characterizing respective motion zones. Each set of motion-zone parameters is generated from portions of a time series of statistical parameters bounded by respective time intervals. In some implementations, the example process 1100 includes analyzing the ranges of motion-zone parameters to identify, for one or more of the motion zones, overlapping ranges of motion-zone parameters and non-overlapping parameter ranges of motion-zone parameters. In some implementations, the ranges of motion-zone parameters include upper bounds and lower bounds of means associated with respective motion zones. In some implementations, the ranges of motion-zone parameters include upper bounds and lower bounds of standard deviations associated with respective motion zones.

In some implementations, the operation 1150 of using the ranges of motion-zone parameters includes generating motion-zone parameters for the motion event based on a time series of statistical parameters produced in response to the motion event. The operation 1150 also includes comparing the motion-zone parameters to the ranges of motion-zone parameters for each respective motion zone, thereby identifying one of the motion zones as a location of the motion event. In some instances, the motion-zone parameters include a mean.

In some implementations, the example process 1100 includes repeating the operations, over multiple iterations for respective time frames, of obtaining the time series of statistical parameters, identifying time intervals, determining ranges of motion-zone parameters, storing the ranges of motion-zone parameters, and using the ranges of motion-zone parameters. The example process 1100 also includes determining a difference by comparing, from a subsequent time frame, subsequent ranges of motion-zone parameters with prior ranges of motion zone parameters from a prior time frame. The example process 1100 additionally includes updating, in the database of the motion detection system, the ranges of motion-zone parameters for the respective motion zones based on the difference.

Figure 12:
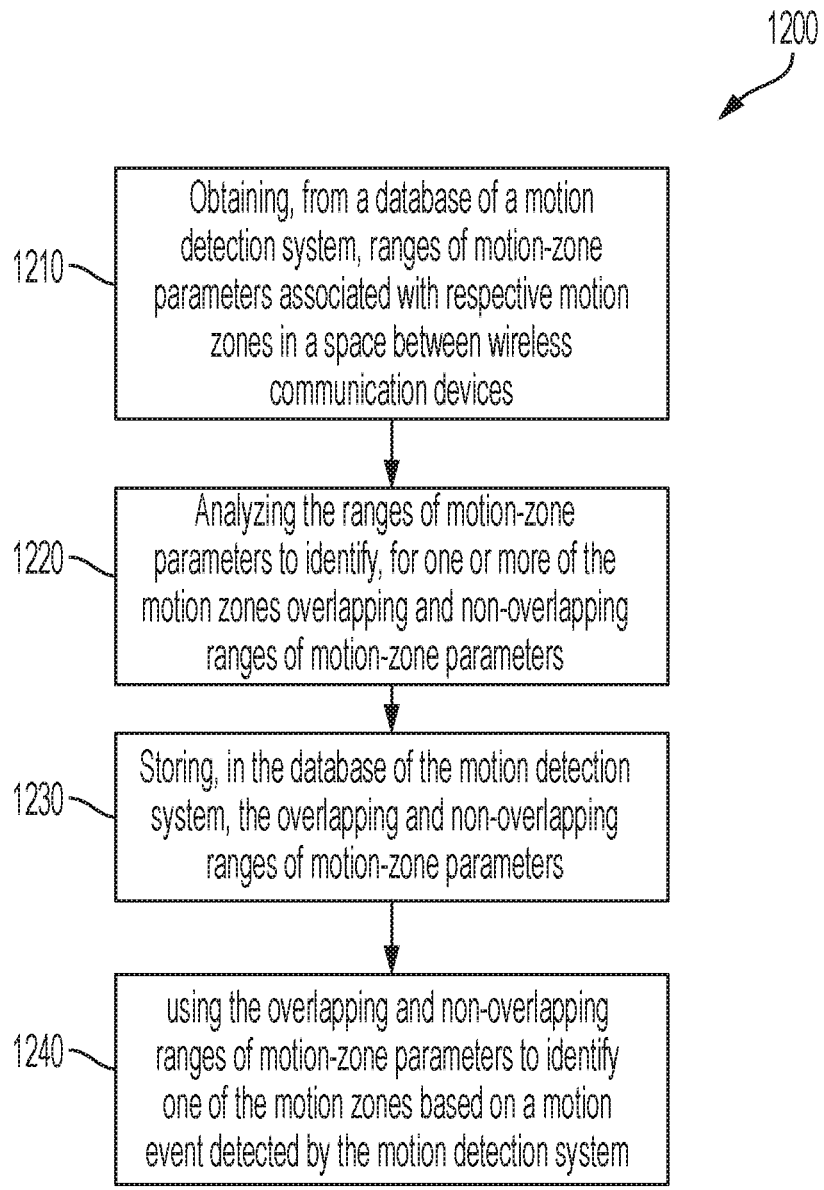
FIG. 12 is a flow chart showing an example process to determine a confidence level for motion zones identified as locations for detected motion.

Now referring to FIG. 12, a flow chart is presented showing an example process 1200 to determine a confidence level for motion zones identified as locations for detected motion. The example process 1200 may be performed, for example, by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 1200 may be performed by a remote computer system (e.g., a server in the cloud), a wireless communication device (e.g., one or more of the wireless communication devices), or another type of system. For example, operations in the example process 1200 may be performed by one or more of the example wireless communication devices 102A, 102B, 102C in FIG. 1. A non-transitory computer-readable medium may also store instructions that are operable, when executed by data processing apparatus (e.g., the example wireless communication devices 102A, 102B, 102C in FIG. 1), to perform one or more operations of process 1200.

The example process 1200 may include additional or different operations, and the operations may be performed in the order shown or in another order. In some cases, one or more of the operations shown in FIG. 12 can be implemented as processes that include multiple operations, sub-processes or other types of routines. In some cases, operations can be combined, performed in another order, performed in parallel, iterated, or otherwise repeated or performed in another manner.

As shown by operation 1210, the example process 1200 includes obtaining, from a database of a motion detection system, ranges of motion-zone parameters associated with respective motion zones in a space between wireless communication devices. The ranges of motion-zone parameters are derived from sets of channel response data based on wireless signals communicated over wireless links through the space. The example process 1200 also includes analyzing the ranges of motion-zone parameters to identify, for one or more of the motion zones, overlapping ranges of motion-zone parameters and non-overlapping parameter ranges of motion-zone parameters, as shown by operation 1220.

The overlapping and non-overlapping ranges of motion-zone parameters are stored in the database of the motion detection system, as shown by operation 1230. The example process 1200 additionally includes using the overlapping and non-overlapping ranges of motion-zone parameters to identify one of the motion zones based on a motion event detected by the motion detection system.

In some implementations, the example process 1200 includes generating motion-zone parameters for the motion event based on one or more time series of statistical parameters produced in response to the motion event. The example process 1200 also includes determining a confidence level, based on the motion-zone parameters, that characterizes a degree to which the identified motion zone represents a location of the motion event. In further implementations, the example process 1200 includes determining a statistical boundary between first values of motion-zone parameters associated with the identified motion zone and second values of motion-zone parameters associated with a second motion zone. The statistical boundary represents an equal confidence level of the motion event occurring in either the identified motion zone or the second motion zone. The example process 1200 also includes determining a distance of the motion-zone parameters from the statistical boundary towards the first values. The distance, when increasing towards the first values, corresponds to an increasing confidence level that the identified motion zone represents the location of the motion event. In some instances, determining the statistical boundary includes using a support vector machine to determine a hyperplane between the first values and the second values.

In some implementations, the example process 1200 includes repeating the operations, over multiple iterations for respective time frames, of obtaining ranges of motion-zone parameters, analyzing the ranges of motion-zone parameters, storing the overlapping and non-overlapping ranges of motion-zone parameters, and using the overlapping and non-overlapping ranges of motion-zone parameters. In these implementations, the example process 1200 also includes determining a difference by comparing, from a subsequent time frame, subsequent overlapping and non-overlapping ranges of motion-zone parameters with prior overlapping and non-overlapping ranges of motion-zone parameters from a prior time frame. The example process 1200 additionally includes updating, in the database of the motion detection system, one or both of the overlapping and non-overlapping ranges of motion-zone parameters based on the difference.

In some implementations, the example process 1200 includes generating sets of motion-zone parameters characterizing respective motion zones. Each set of motion-zone parameters is generated from portions of a time series of statistical parameters bounded by respective time intervals, and each time series of statistical parameters is based on a respective set of channel response data. The example process 1200 may optionally determine, by analyzing multiple time windows within each of the time intervals, ranges of motion-zone parameters associated with each respective motion zone.

Figure 13:
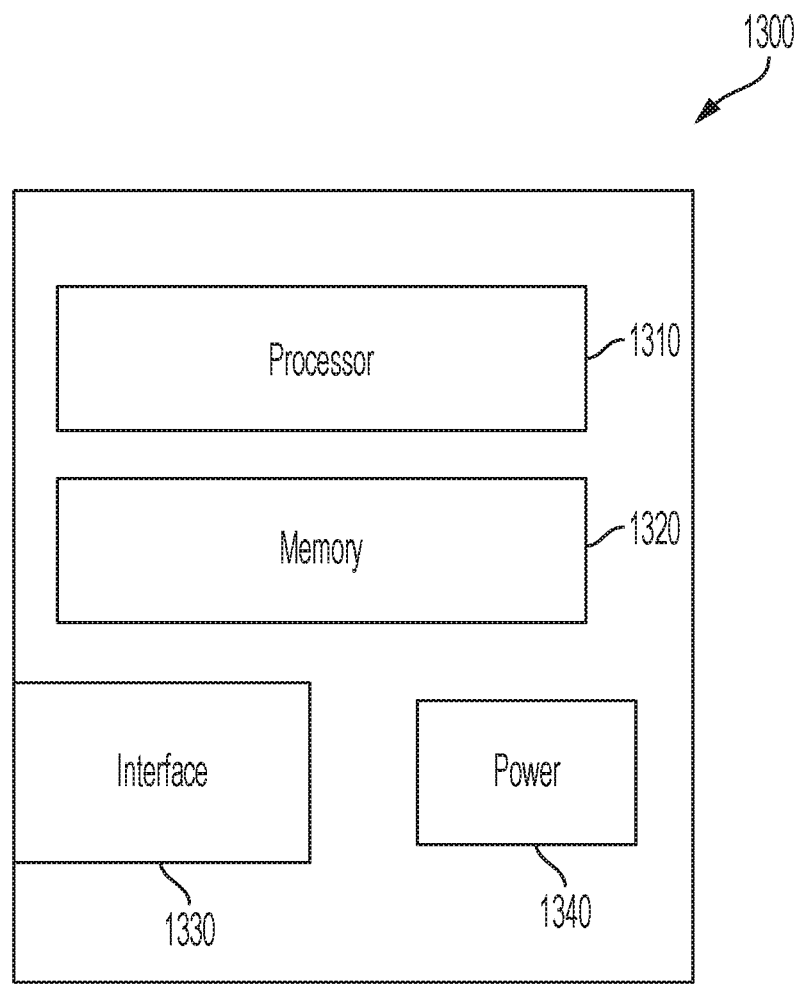
FIG. 13 is a block diagram showing an example wireless communication device.

Now referring to FIG. 13, a block diagram is presented showing an example wireless communication device 1300. As shown in FIG. 13, the example wireless communication device 1300 includes an interface 1330, a processor 1310, a memory 1320, and a power unit 1340. A wireless communication device (e.g., any of the wireless communication devices 102A, 102B, 102C in FIG. 1) may include additional or different components, and the wireless communication device 1300 may be configured to operate as described with respect to the examples above. In some implementations, the interface 1330, processor 1310, memory 1320, and power unit 1340 of a wireless communication device are housed together in a common housing or other assembly. In some implementations, one or more of the components of a wireless communication device can be housed separately, for example, in a separate housing or other assembly.

The example interface 1330 can communicate (receive, transmit, or both) wireless signals. For example, the interface 1330 may be configured to communicate radio frequency (RF) signals formatted according to a wireless communication standard (e.g., Wi-Fi, 4G, 5G, Bluetooth, etc.). In some implementations, the example interface 1330 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 1310 can execute instructions, for example, to generate output data based on data inputs. The instructions can include programs, codes, scripts, modules, or other types of data stored in memory 1320. Additionally or alternatively, the instructions can be encoded as pre-programmed or re-programmable logic circuits, logic gates, or other types of hardware or firmware components or modules. The processor 1310 may be or include a general-purpose microprocessor, as a specialized co-processor or another type of data processing apparatus. In some cases, the processor 1310 performs high level operation of the wireless communication device 1300. For example, the processor 1310 may be configured to execute or interpret software, scripts, programs, functions, executables, or other instructions stored in the memory 1320. In some implementations, the processor 1310 be included in the interface 1330 or another component of the wireless communication device 1300.

The example memory 1320 may include computer-readable storage media, for example, a volatile memory device, a non-volatile memory device, or both. The memory 1320 may include one or more read-only memory devices, random-access memory devices, buffer memory devices, or a combination of these and other types of memory devices. In some instances, one or more components of the memory can be integrated or otherwise associated with another component of the wireless communication device 1300. The memory 1320 may store instructions that are executable by the processor 1310. For example, the instructions may include instructions to perform one or more of the operations in the example process 900 shown in FIG. 9, one or more of the operations in the example process 1000 shown in FIG. 10, one or more of the operations in the example process 1100 shown in FIG. 11, or one or more of the operations in the example process 1200 shown in FIG. 12.

The example power unit 1340 provides power to the other components of the wireless communication device 1300. For example, the other components may operate based on electrical power provided by the power unit 1340 through a voltage bus or other connection. In some implementations, the power unit 1340 includes a battery or a battery system, for example, a rechargeable battery. In some implementations, the power unit 1340 includes an adapter (e.g., an AC adapter) that receives an external power signal (from an external source) and coverts the external power signal to an internal power signal conditioned for a component of the wireless communication device 1300. The power unit 1320 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
    obtaining, from a database of a motion detection system, ranges of motion-zone parameters associated with respective motion zones in a space between wireless communication devices, the ranges of motion-zone parameters derived from sets of channel response data based on wireless signals communicated over wireless links through the space;
    analyzing the ranges of motion-zone parameters to identify, for one or more of the motion zones, overlapping ranges of motion-zone parameters and non-overlapping parameter ranges of motion-zone parameters;
    storing, in the database of the motion detection system, the overlapping and non-overlapping ranges of motion-zone parameters; and
    using the overlapping and non-overlapping ranges of motion-zone parameters to identify one of the motion zones based on a motion event detected by the motion detection system.

2. The method of claim 1, comprising:
    generating motion-zone parameters for the motion event based on one or more time series of statistical parameters produced in response to the motion event; and
    determining a confidence level, based on the motion-zone parameters, that characterizes a degree to which the identified motion zone represents a location of the motion event.

3. The method of claim 2, wherein determining the confidence level comprises:
    determining a statistical boundary between first values of motion-zone parameters associated with the identified motion zone and second values of motion-zone parameters associated with a second motion zone, the statistical boundary representing an equal confidence level of the motion event occurring in either the identified motion zone or the second motion zone; and
    determining a distance of the motion-zone parameters from the statistical boundary towards the first values;

wherein the distance, when increasing towards the first values, corresponds to an increasing confidence level that the identified motion zone represents the location of the motion event.

4. The method of claim 3, wherein determining the statistical boundary comprises using a support vector machine to determine a hyperplane between the first values and the second values.

5. The method of claim 1, wherein the method comprises:
repeating the operations, over multiple iterations for respective time frames, of obtaining ranges of motion-zone parameters, analyzing the ranges of motion-zone parameters, storing the overlapping and non-overlapping ranges of motion-zone parameters, and using the overlapping and non-overlapping ranges of motion-zone parameters;
determining a difference by comparing, from a subsequent time frame, subsequent overlapping and non-overlapping ranges of motion-zone parameters with prior overlapping and non-overlapping ranges of motion-zone parameters from a prior time frame; and
updating, in the database of the motion detection system, one or both of the overlapping and non-overlapping ranges of motion-zone parameters based on the difference.

6. The method of claim 1, comprising:
generating sets of motion-zone parameters characterizing respective motion zones, each set of motion-zone parameters generated from portions of a time series of statistical parameters bounded by respective time intervals, each time series of statistical parameters based on a respective set of channel response data.

7. The method of claim 6, comprising:
determining, by analyzing multiple time windows within each of the time intervals, ranges of motion-zone parameters associated with each respective motion zone.

8. A system comprising:
wireless communication devices in a wireless communication network that are configured to exchange wireless signals over wireless links, each wireless link defined between a respective pair of the wireless communication devices; and
one or more processors; and
memory storing instructions that are configured to perform operations when executed by the one or more processors, the operations comprising:
obtaining, from a database of a motion detection system, ranges of motion-zone parameters associated with respective motion zones in a space between wireless communication devices, the ranges of motion-zone parameters derived from sets of channel response data based on wireless signals communicated over wireless links through the space;
analyzing the ranges of motion-zone parameters to identify, for one or more of the motion zones, overlapping ranges of motion-zone parameters and non-overlapping parameter ranges of motion-zone parameters;
storing, in the database of the motion detection system, the overlapping and non-overlapping ranges of motion-zone parameters; and
using the overlapping and non-overlapping ranges of motion-zone parameters to identify one of the motion zones based on a motion event detected by the motion detection system.

9. The system of claim 8, the operations comprising:
generating motion-zone parameters for the motion event based on one or more time series of statistical parameters produced in response to the motion event; and
determining a confidence level, based on the motion-zone parameters, that characterizes a degree to which the identified motion zone represents a location of the motion event.

10. The system of claim 9, wherein determining the confidence level comprises:
determining a statistical boundary between first values of motion-zone parameters associated with the identified motion zone and second values of motion-zone parameters associated with a second motion zone, the statistical boundary representing an equal confidence level of the motion event occurring in either the identified motion zone or the second motion zone; and
determining a distance of the motion-zone parameters from the statistical boundary towards the first values;
wherein the distance, when increasing towards the first values, corresponds to an increasing confidence level that the identified motion zone represents the location of the motion event.

11. The system of claim 10, wherein determining the statistical boundary comprises using a support vector machine to determine a hyperplane between the first values and the second values.

12. The system of claim 8, wherein the operations comprise:
repeating the operations, over multiple iterations for respective time frames, of obtaining ranges of motion-zone parameters, analyzing the ranges of motion-zone parameters, storing the overlapping and non-overlapping ranges of motion-zone parameters, and using the overlapping and non-overlapping ranges of motion-zone parameters;
determining a difference by comparing, from a subsequent time frame, subsequent overlapping and non-overlapping ranges of motion-zone parameters with prior overlapping and non-overlapping ranges of motion-zone parameters from a prior time frame; and
updating, in the database of the motion detection system, one or both of the overlapping and non-overlapping ranges of motion-zone parameters based on the difference.

13. The system of claim 8, the operations comprising:
generating sets of motion-zone parameters characterizing respective motion zones, each set of motion-zone parameters generated from portions of a time series of statistical parameters bounded by respective time intervals, each time series of statistical parameters based on a respective set of channel response data.

14. The system of claim 13, the operations comprising:
determining, by analyzing multiple time windows within each of the time intervals, ranges of motion-zone parameters associated with each respective motion zone.

15. A non-transitory computer-readable medium storing instructions that, when executed by data processing apparatus, cause the data processing apparatus to perform operations comprising:
obtaining, from a database of a motion detection system, ranges of motion-zone parameters associated with respective motion zones in a space between wireless communication devices, the ranges of motion-zone parameters derived from sets of channel response data based on wireless signals communicated over wireless links through the space;

analyzing the ranges of motion-zone parameters to identify, for one or more of the motion zones, overlapping ranges of motion-zone parameters and non-overlapping parameter ranges of motion-zone parameters;

storing, in the database of the motion detection system, the overlapping and non-overlapping ranges of motion-zone parameters; and using the overlapping and non-overlapping ranges of motion-zone parameters to identify one of the motion zones based on a motion event detected by the motion detection system.

16. The computer-readable medium of claim 15, the operations comprising:

generating motion-zone parameters for the motion event based on one or more time series of statistical parameters produced in response to the motion event; and determining a confidence level, based on the motion-zone parameters, that characterizes a degree to which the identified motion zone represents a location of the motion event.

17. The computer-readable medium of claim 16, wherein determining the confidence level comprises:

determining a statistical boundary between first values of motion-zone parameters associated with the identified motion zone and second values of motion-zone parameters associated with a second motion zone, the statistical boundary representing an equal confidence level of the motion event occurring in either the identified motion zone or the second motion zone; and determining a distance of the motion-zone parameters from the statistical boundary towards the first values;

wherein the distance, when increasing towards the first values, corresponds to an increasing confidence level that the identified motion zone represents the location of the motion event.

18. The computer-readable medium of claim 17, wherein determining the statistical boundary comprises using a support vector machine to determine a hyperplane between the first values and the second values.

19. The computer-readable medium of claim 15, wherein the operations comprises:

repeating the operations, over multiple iterations for respective time frames, of obtaining ranges of motion-zone parameters, analyzing the ranges of motion-zone parameters, storing the overlapping and non-overlapping ranges of motion-zone parameters, and using the overlapping and non-overlapping ranges of motion-zone parameters;

determining a difference by comparing, from a subsequent time frame, subsequent overlapping and non-overlapping ranges of motion-zone parameters with prior overlapping and non-overlapping ranges of motion-zone parameters from a prior time frame; and updating, in the database of the motion detection system, one or both of the overlapping and non-overlapping ranges of motion-zone parameters based on the difference.

20. The computer-readable medium of claim 15, the operations comprising:

generating sets of motion-zone parameters characterizing respective motion zones, each set of motion-zone parameters generated from portions of a time series of statistical parameters bounded by respective time intervals, each time series of statistical parameters based on a respective set of channel response data.

21. The computer-readable medium of claim 20, the operations comprising:

determining, by analyzing multiple time windows within each of the time intervals, ranges of motion-zone parameters associated with each respective motion zone.

* * * * *

UNITED STATES PATENT AND TRADEMARK OFFICE
CERTIFICATE OF CORRECTION

PATENT NO. : 10,460,581 B1
APPLICATION NO. : 16/413165
DATED : October 29, 2019
INVENTOR(S) : Devison et al.

Page 1 of 1

It is certified that error appears in the above-identified patent and that said Letters Patent is hereby corrected as shown below:

In the Specification

Column 5, Line 2, delete "110A, 11B)." and insert -- 110A, 110B). -- therefor.

Column 10, Line 60, delete "t+i→t+1." and insert -- $t + i \to t + j$. -- therefor.

Column 10, Line 63, delete "t+i→t+1." and insert -- $t + i \to t + j$. -- therefor.

Column 18, Line 45, delete "$\overline{(\overline{w}\cdot\overline{x})}-\overline{x}=0$" and insert -- $(\vec{w} \cdot \vec{x}) - b = 0$ -- therefor.

Column 18, Line 47, delete "$\overline{w}$" and insert -- $\vec{w}$ -- therefor.

Column 18, Line 50, delete "808," and insert -- 806, -- therefor.

Column 18, Line 55, delete "$\overline{(\overline{w}\cdot\overline{x}}=1$ and $\overline{(\overline{w}\cdot\overline{x}}=-1$." and insert -- $(\vec{w} \cdot \vec{x}) - b = 1$ and $(\vec{w} \cdot \vec{x}) - b = -1$. -- therefor.

Column 19, Line 62, after "FIG. 6", insert -- . --.

Column 22, Line 16, delete "100" and insert -- 1000 -- therefor.

Column 26, Line 49, delete "1320" and insert -- 1340 -- therefor.

Signed and Sealed this
Seventeenth Day of March, 2020

Andrei Iancu
*Director of the United States Patent and Trademark Office*